United States Patent
Fiebig

(10) Patent No.: US 7,947,094 B2
(45) Date of Patent: May 24, 2011

(54) MICROCARTRIDGE HYDROGEN GENERATOR

(75) Inventor: Brad Fiebig, League City, TX (US)

(73) Assignee: Lynntech, Inc., College Station, TX (US)

( * ) Notice: Subject to any disclaimer, the term of this patent is extended or adjusted under 35 U.S.C. 154(b) by 0 days.

(21) Appl. No.: 11/820,727

(22) Filed: Jun. 19, 2007

(65) Prior Publication Data

US 2008/0014481 A1 Jan. 17, 2008

Related U.S. Application Data

(60) Provisional application No. 60/815,371, filed on Jun. 20, 2006, provisional application No. 60/834,908, filed on Aug. 1, 2006.

(51) Int. Cl.
*H01M 8/18* (2006.01)

(52) U.S. Cl. ............... 48/118.5; 48/61; 429/416

(58) Field of Classification Search ........... 48/61, 127.9
See application file for complete search history.

(56) References Cited

U.S. PATENT DOCUMENTS

| | | | |
|---|---|---|---|
| 6,939,529 B2 | 9/2005 | Strizki et al. | |
| 2002/0025462 A1* | 2/2002 | Nakanishi et al. | 429/19 |
| 2002/0083643 A1 | 7/2002 | Amendola et al. | |
| 2002/0088178 A1 | 7/2002 | Davis | |
| 2002/0102447 A1* | 8/2002 | Kato | 429/23 |
| 2002/0166286 A1 | 11/2002 | McClaine et al. | |
| 2002/0182459 A1 | 12/2002 | Hockaday et al. | |
| 2003/0009942 A1 | 1/2003 | Amendola et al. | |
| 2003/0053281 A1* | 3/2003 | Takeuchi et al. | 361/160 |
| 2003/0157018 A1 | 8/2003 | Zaluski et al. | |
| 2004/0009379 A1 | 1/2004 | Amendola et al. | |
| 2004/0009392 A1 | 1/2004 | Petillo et al. | |
| 2004/0033194 A1 | 2/2004 | Amendola et al. | |
| 2004/0035054 A1 | 2/2004 | Mohring et al. | |
| 2004/0047801 A1 | 3/2004 | Petillo et al. | |
| 2004/0048116 A1 | 3/2004 | Ord et al. | |
| 2004/0067195 A1 | 4/2004 | Strizki et al. | |
| 2004/0101720 A1* | 5/2004 | Ogawa | 429/20 |
| 2004/0120889 A1 | 6/2004 | Shah et al. | |
| 2004/0146754 A1 | 7/2004 | Arthur et al. | |
| 2004/0148857 A1 | 8/2004 | Strizki et al. | |
| 2004/0166057 A1 | 8/2004 | Schell et al. | |
| 2005/0022883 A1 | 2/2005 | Adams et al. | |
| 2005/0023236 A1 | 2/2005 | Adams et al. | |
| 2005/0036941 A1 | 2/2005 | Bae et al. | |
| 2005/0074643 A1 | 4/2005 | Adams et al. | |
| 2005/0115637 A1 | 6/2005 | Adams et al. | |
| 2005/0116190 A1 | 6/2005 | Adams et al. | |
| 2005/0118463 A1* | 6/2005 | Okachi et al. | 429/7 |
| 2005/0132640 A1 | 6/2005 | Kelly et al. | |
| 2005/0135996 A1 | 6/2005 | Ortega et al. | |
| 2005/0158595 A1* | 7/2005 | Marsh et al. | 429/19 |
| 2005/0175868 A1 | 8/2005 | McClaine et al. | |

(Continued)

*Primary Examiner* — Alexa D Neckel
*Assistant Examiner* — Imran Akram
(74) *Attorney, Agent, or Firm* — John A. Fortkort; Fortkort & Houston P.C.

(57) ABSTRACT

A hydrogen generator (101) is provided which comprises a third chamber (109) containing a catalyst (121), a first chamber (103) containing a fluid, a second chamber (105) containing a material that reacts with the fluid in the presence of the catalyst to generate hydrogen gas, and a valve (111) movable from a first position in which the flow of fluid along a pathway including the first, second and third chambers is enabled, to a second position in which the flow of fluid along the pathway is prevented.

37 Claims, 30 Drawing Sheets

U.S. PATENT DOCUMENTS

| | | |
|---|---|---|
| 2005/0238573 A1 | 10/2005 | Zhang et al. |
| 2005/0255359 A1 | 11/2005 | Adams et al. |
| 2005/0268555 A1 | 12/2005 | Amendola et al. |
| 2005/0276746 A1 | 12/2005 | Zhang et al. |
| 2006/0021279 A1 | 2/2006 | Mohring et al. |
| 2006/0030652 A1 | 2/2006 | Adams et al. |
| 2006/0042162 A1 | 3/2006 | Goldstein et al. |
| 2006/0071088 A1 | 4/2006 | Adams et al. |
| 2006/0191199 A1 | 8/2006 | Rosenzweig et al. |
| 2006/0243045 A1 | 11/2006 | Curello et al. |
| 2007/0280862 A1* | 12/2007 | Davis et al. .................. 422/141 |

* cited by examiner

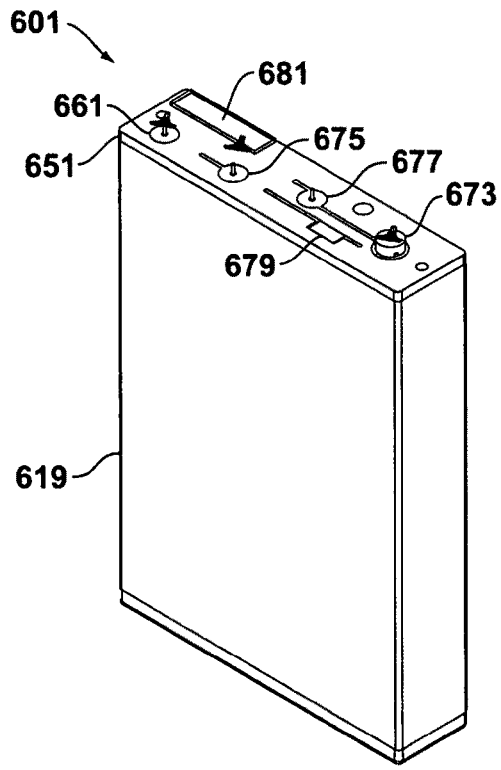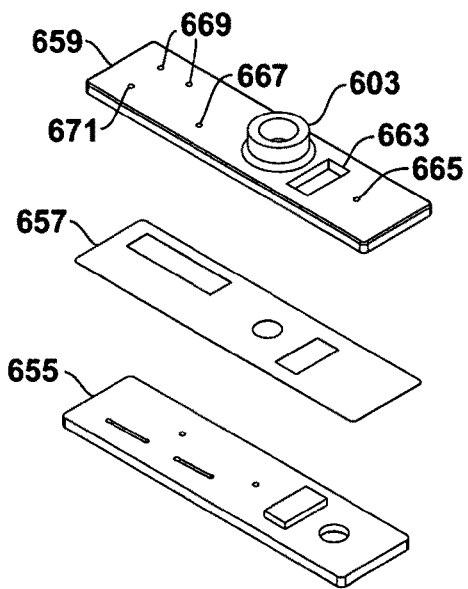
FIG. 28
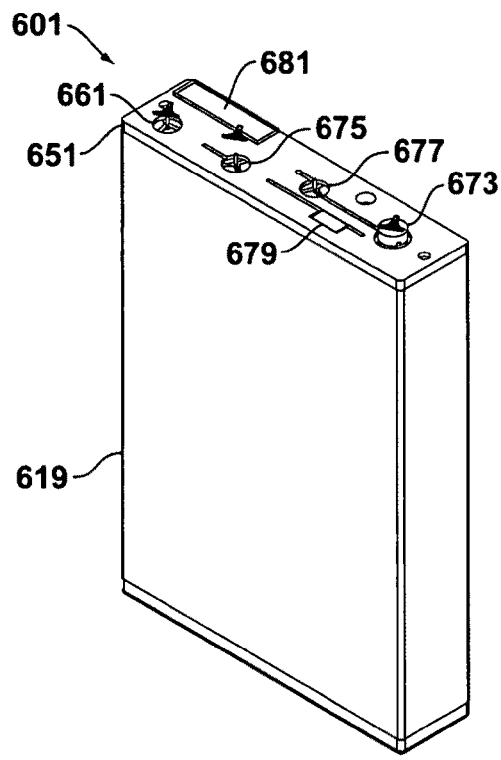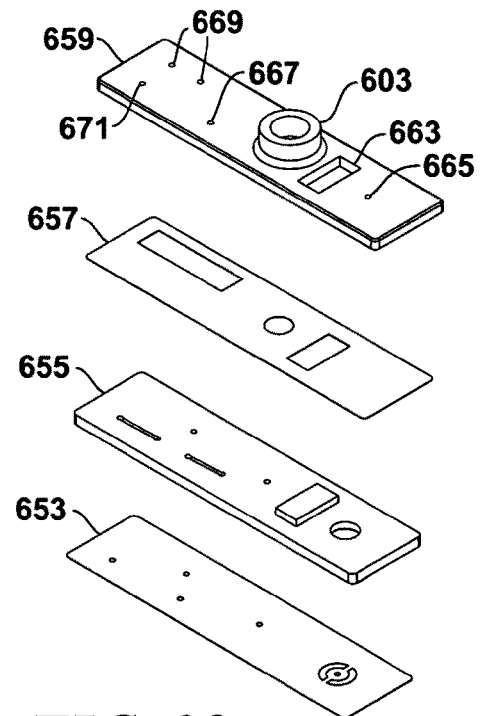
FIG. 29

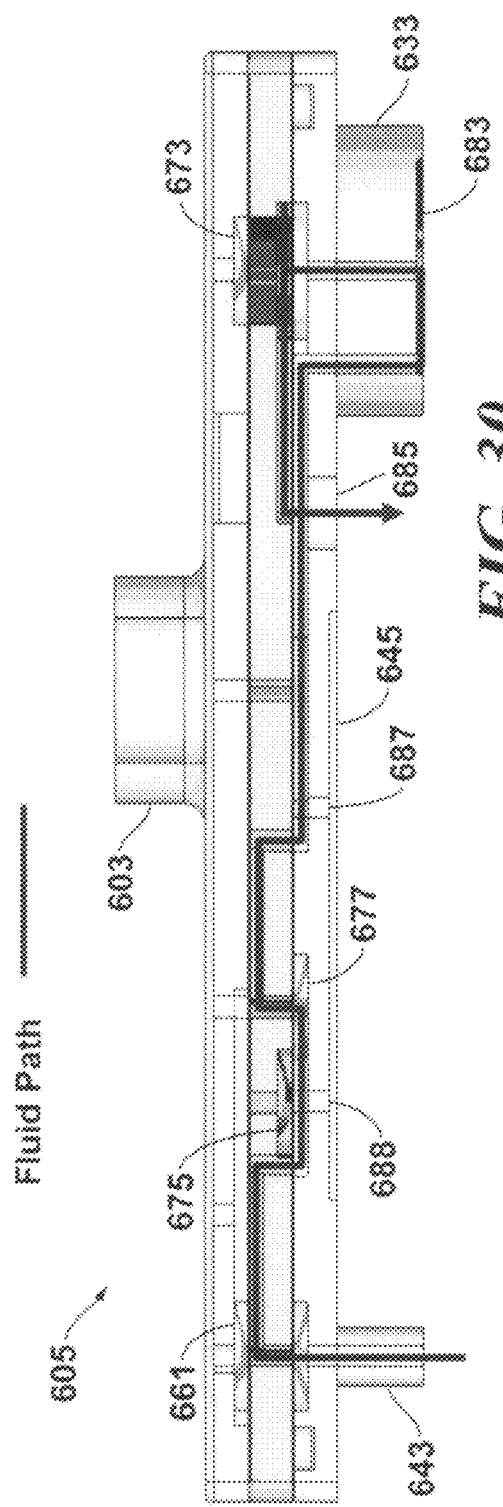
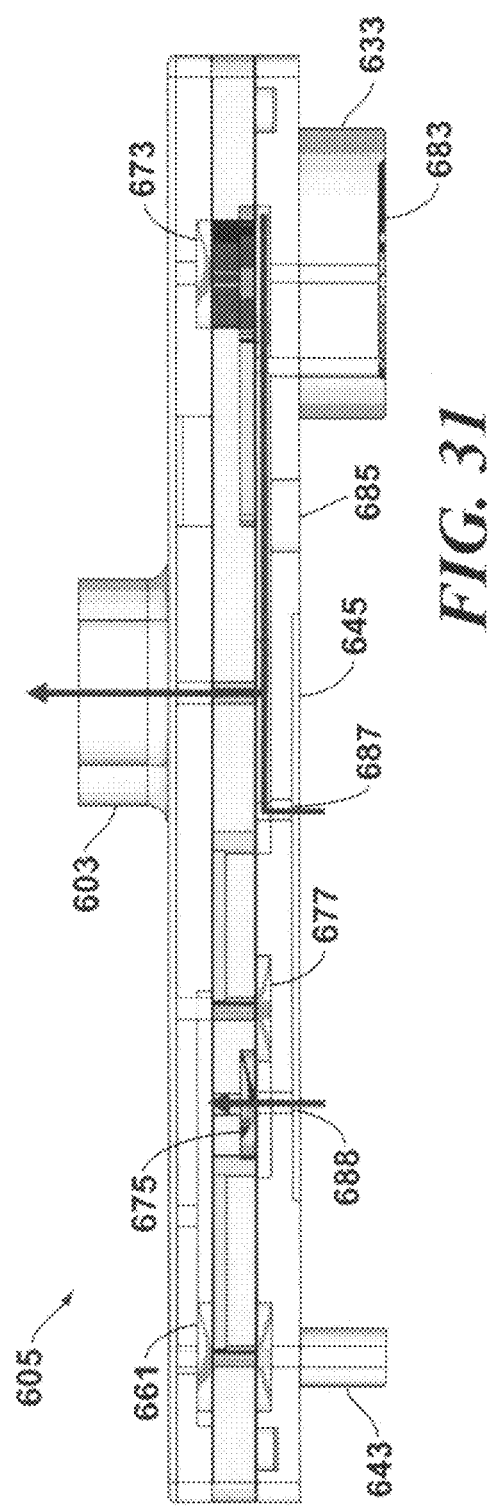

MICROCARTRIDGE HYDROGEN GENERATOR

CROSS-REFERENCE TO RELATED APPLICATIONS

The present application claims priority to U.S. Ser. No. 60/815,371, filed on Jun. 20, 2006 and entitled "MICROCARTRIDGE HYDROGEN GENERATOR", and to U.S. Ser. No. 60/834,908, filed on Aug. 1, 2006 and entitled "MICROCARTRIDGE HYDROGEN GENERATOR", both of which are incorporated herein by reference in their entirety.

FIELD OF THE DISCLOSURE

The present disclosure relates generally to hydrogen generators, and more specifically to hydrogen generators that may be incorporated into hand-held devices.

BACKGROUND OF THE DISCLOSURE

Hydrogen generators are devices that generate hydrogen gas for use in fuel cells, combustion engines, and other devices, often through the evolution of hydrogen gas from chemical hydrides, borohydrides or boranes. Sodium borohydride ($NaBH_4$) has emerged as a particularly desirable chemical hydride for use in such devices, due to the molar equivalents of hydrogen it generates (see EQUATION 1 below), the relatively low mass of $NaBH_4$ as compared to some competing materials, and the controllability of the hydrogen evolution reaction:

$$NaBH_4 + 2H_2O \leftrightarrow NaBO_2 + 4H_2 \quad \text{(EQUATION 1)}$$

The hydrolysis of hydrogen-generating materials in general, and sodium borohydride in particular, as a method of hydrogen generation has received significant interest in the art, due to the high gravimetric storage density of hydrogen in these materials and the ease of creating a pure hydrogen stream from the hydrolysis reaction. However, in some applications, such as when hydrogen generators are used in combination with hydrogen fuel cells to power laptops or hand-held devices and electronics, the inability to adequately control the generation of hydrogen gas is a drawback from a system perspective. Ideally, in such an application, the hydrogen generator should be able to produce a stream of hydrogen gas promptly when the gas stream is needed, and should likewise be able to promptly terminate the flow of hydrogen gas when it is no longer needed.

In reality, however, most hydrogen generators currently available display a significant lag time from the point of time at which the demand for hydrogen commences, and the point of time at which the flow of hydrogen gas is suitable to meet that demand. Perhaps more significantly, the flow of hydrogen in most currently available hydrogen generators does not cease with demand, and may even proceed until the hydrogen generating material has been depleted. The generation of hydrogen gas in excess of demand is problematic for hydrogen generators in general, and for small hydrogen generators (of the type designed for incorporation into laptop PCs and hand-held devices) in particular. Aside from the danger of fire or explosion, the excess gas creates pressure spikes that can damage the generator and its components.

Moreover, the need to accommodate such pressure spikes and to store excess hydrogen gas requires hydrogen generators to be heavier, bulkier, stronger, and more complicated than would otherwise be the case. Since space and weight are typically at a premium in laptop computers and hand-held devices, this is a serious drawback in hydrogen generators. Venting excess hydrogen gas is typically not an option in these devices due to the obvious fire risks and, in any event, is undesirable in that it reduces the effective yield of the hydrogen generator.

There is thus a need in the art for a hydrogen generator that offers fast response time to the need for hydrogen so that a supply of hydrogen is available on demand. There is also a need in the art for a hydrogen generator that effectively halts the production of hydrogen gas when the demand for hydrogen abates, so that excess hydrogen is not generated. There is further a need in the art for a hydrogen generator with minimum dimensions, weight and space requirements. These and other needs are met by the devices and methodologies disclosed herein.

BRIEF DESCRIPTION OF THE DRAWINGS

FIG. 28 is a partially exploded view of the hydrogen generator of FIG. 17;

FIG. 29 is a partially exploded view of the hydrogen generator of FIG. 17;

FIG. 30 is an illustration showing the fluid path in the fluid manifold of the hydrogen generator of FIG. 17;

FIG. 31 is an illustration showing the hydrogen path in the fluid manifold of the hydrogen generator of FIG. 17;

DETAILED DESCRIPTION

Figure 1:
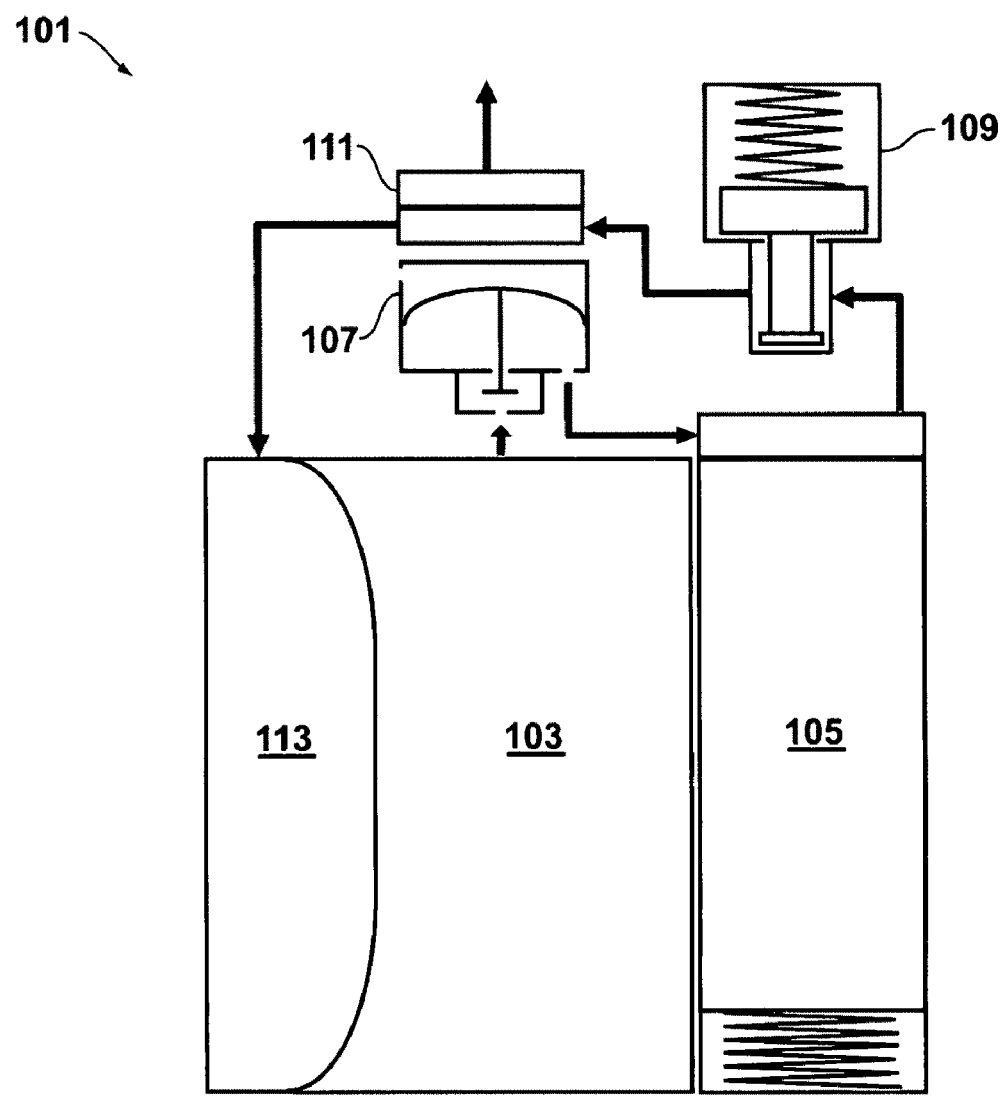
FIG. 1 is an illustration of a particular, non-limiting embodiment of a hydrogen generator in accordance with the teachings herein.

In one aspect, a hydrogen generator is provided herein which comprises (a) a fluid; (b) a catalytic chamber containing a catalyst; (c) a hydrogen-containing material that reacts with the fluid in the presence of the catalyst to generate hydrogen gas; and (d) an inlet adapted to input a mixture of the fluid and the hydrogen-containing material into the reaction chamber. The catalytic chamber is adapted to withdraw the catalyst from the mixture when the pressure of hydrogen gas within the catalytic chamber reaches a predetermined level.

In another aspect, a hydrogen generator is provided which comprises a catalyst, and a fluid which reacts in the presence of said catalyst to evolve hydrogen gas. The hydrogen generator transitions from a first condition when the pressure of hydrogen gas within the hydrogen generator is $P_1$, to a second condition when the pressure of hydrogen gas within the hydrogen generator is $P_2$, wherein $P_2 > P_1$. When the hydrogen generator is in the first state, the fluid is in contact with the catalyst. When the hydrogen generator is in the second state, fluid is withdrawn from contact with the catalyst.

In still another aspect, a hydrogen generator is provided which comprises (a) a catalyst; (b) a fluid; (c) a hydrogen-containing material; (d) a mixing chamber adapted to form a mixture of said fluid and said hydrogen-containing material; and (e) a reaction chamber adapted to react said mixture in the presence of said catalyst to generate hydrogen gas; wherein the hydrogen generator transitions from a first condition when the pressure of hydrogen gas within the reaction chamber is $P_1$, to a second condition when the pressure of hydrogen gas within the reaction chamber is $P_2$, where $P_2 > P_1$; wherein the mixing chamber is adapted to generate said mixture when said hydrogen generator is in said first state; and wherein said mixing chamber is adapted to cease generation of said mixture when said hydrogen generator is in said second state.

In another aspect, a hydrogen generator is provided which comprises (a) a catalyst; (b) a fluid; (c) a hydrogen-containing material; and (d) a reaction chamber adapted to react a mixture of said fluid and said hydrogen-containing material in the presence of said catalyst to generate hydrogen gas, and being further adapted to separate the generated hydrogen gas from reaction byproducts.

In a further aspect, a hydrogen generator is provided which comprises a third chamber containing a catalyst, a first chamber containing a fluid, a second chamber containing a material that reacts with the fluid in the presence of the catalyst to generate hydrogen gas, and a valve movable from a first position in which the flow of fluid along a pathway including the first, second and third chambers is enabled, to a second position in which the flow of fluid along the pathway is prevented.

In yet another aspect, a hydrogen generator is provided which comprises a fluid reservoir containing a fluid; a first chamber having a hydrogen-containing material disposed therein, said first chamber being adapted to input a flow of said fluid from said fluid reservoir and to output a mixture of said fluid and said hydrogen-containing material; a reaction chamber containing a catalyst, said reaction chamber being adapted to input said mixture and to react said mixture, in the presence of said catalyst, to evolve hydrogen gas, and being further adapted to output said hydrogen gas and the byproducts of the hydrogen evolution reaction; a separation chamber, downstream from said reaction chamber, which is adapted to separate the hydrogen gas from the reaction byproducts; and a valve movable from a first position in which the flow of fluid along a pathway including the fluid reservoir and the first chamber is enabled, to a second position in which the flow of fluid along the pathway is prevented.

In still another aspect, a hydrogen generator is provided which comprises (a) a catalyst; (b) a first compartment containing a hydrogen-containing material and being equipped with a porous member against which the hydrogen-containing material is pressed; (c) a second compartment containing a fluid that forms a mixture with said hydrogen-containing material, wherein said mixture reacts in the presence of said catalyst to evolve hydrogen gas; and (d) a first channel providing a flow of fluid from said first compartment to said porous member, said first channel being equipped with a valve; wherein the valve is movable from an open position to a closed position when the pressure of hydrogen gas within the generator reaches a predetermined level.

In a further aspect, a method for generating hydrogen gas is provided. In accordance with the method, a fluid, a catalyst, and a hydrogen-containing material that reacts with the fluid in the presence of the catalyst to generate hydrogen gas are provided. A mixture of the fluid and the hydrogen-containing material is then created. When a demand for hydrogen gas exists, the mixture is contacted with the catalyst, thereby generating hydrogen gas. When demand for hydrogen gas abates, the catalyst is withdrawn from contact with the mixture.

In yet another aspect, a method for forming a reactor for a hydrogen generator is provided. In accordance with the method, a core is provided which comprises a first material and having at least one groove in the surface thereof. The groove is then covered with a second material so as to form a passageway between the core and the second material, wherein said passageway has a hydrogen generation catalyst disposed on a surface thereof.

In still another aspect, a method for forming a reactor for a hydrogen generator is provided. In accordance with the method, a core is provided having a hydrogen generation catalyst disposed on a surface thereof. A conduit is also provided which has at least one opening along its length. The conduit is then disposed about the core so that the opening is sealed by the core.

In a further aspect, a hydrogen generator is provided herein which comprises (a) a source of fluid; (b) a catalytic element comprising a catalyst disposed on a substrate; (c) a hydrogen-containing material that reacts with the fluid in the presence of the catalyst to generate hydrogen gas; (d) a conduit for moving a mixture of said fluid and said hydrogen-containing material from a first location to a second location; wherein said catalytic element is movable from a first position in which said catalytic surface is exposed to the mixture disposed within said conduit, to a second position in which said catalytic surface is not exposed to the mixture moving through said conduit.

It is now been found that the aforementioned needs may be met by the devices and methodologies disclosed herein. In particular, a hydrogen generator is disclosed herein which, in some embodiments, provides hydrogen on demand by rapidly commencing and terminating the hydrogen evolution reaction. Preferably, this is achieved by removing the catalyst (if one is utilized) or one of the reactants from the reaction chamber as hydrogen demand abates, and reintroducing the removed element when hydrogen demand increases.

The hydrogen generator may be configured as a small, compact unit, and may be further configured so that, as reactants are exhausted and the space used to store them is freed up, that space may be utilized for the storage of reaction byproducts. In some embodiments, the hydrogen generator may be configured as a passive unit which is sufficiently small so that it can be placed on the back of the handheld device or incorporated into a laptop computer.

FIG. 1 illustrates a first specific, non-limiting embodiment of a hydrogen generator made in accordance with teachings herein. The hydrogen generator 101 comprises a first chamber 103 which contains a fluid that is preferably maintained under a positive pressure, a chamber reservoir 105 which houses a hydrogen-containing material and which is in fluidic communication with the first chamber 103 by way of a shutoff valve 107, a catalytic reactor 109, a separator 111, and a third chamber 113 for holding the byproducts of the hydrogen-generation reaction. The shutoff valve 107 is transformable between a first orientation in which the first chamber 103 is in open communication with the second chamber 105, and a second orientation in which the first chamber 103 is no longer in communication with the second chamber 105.

In use, when the shutoff valve 107 is placed into the first orientation, water flows from the first chamber 103 into the second chamber 105, where it forms a (preferably aqueous) solution or slurry with the hydrogen-generating material. This slurry is then conducted into the catalytic reactor 109 where it undergoes a reaction to evolve hydrogen gas. The hydrogen gas so generated is then conducted to the separator 111, where it is separated from any reaction byproducts, unreacted materials, or solids or liquids that may have contaminated the hydrogen gas stream. The hydrogen gas then exits the separator 111 by way of a suitable outlet, and any reaction byproducts, unreacted materials, solids or liquids that have been separated from the hydrogen gas stream are transported to the third chamber 113. In some embodiments, backflow of hydrogen gas between the third chamber 113 and the separator may be permitted to accommodate the continued reaction or decomposition of hydrogen-containing materials stored therein. Thus, for example, the third chamber 113, the separator 111, and/or a conduit connecting these elements may be equipped with a one-way flow mechanism which permits a backflow of hydrogen gas but prevents the backflow of liquids or solids. Such a mechanism may comprise, for example, a one-way flow valve in which the valve comprises a hydrogen-permeable material.

In the preferred embodiment, the first chamber 103 contains water. The water may be present as an aqueous solution which may also contain suitable pH adjusting agents, anti-foaming agents, surfactants, solvents, co-solvents or the like, and which may also contain other materials or compounds such as methanol, ethanol or other alcohols. The first chamber 103 is preferably capable of undergoing a volumetric reduction as fluid is withdrawn from the reservoir to accommodate expansion in the third chamber 113 as the amount of reaction byproducts accumulates. This may be accomplished, for example, by forming the first and/or third chambers out of flexible or elastomeric materials, or through the use of elastic bands, springs, or the like to apply pressure to the first and/or third chambers. In some embodiments, these chambers may be disposed adjacent to each other, and one of these chambers may be used to apply pressure to the other.

Figure 2:
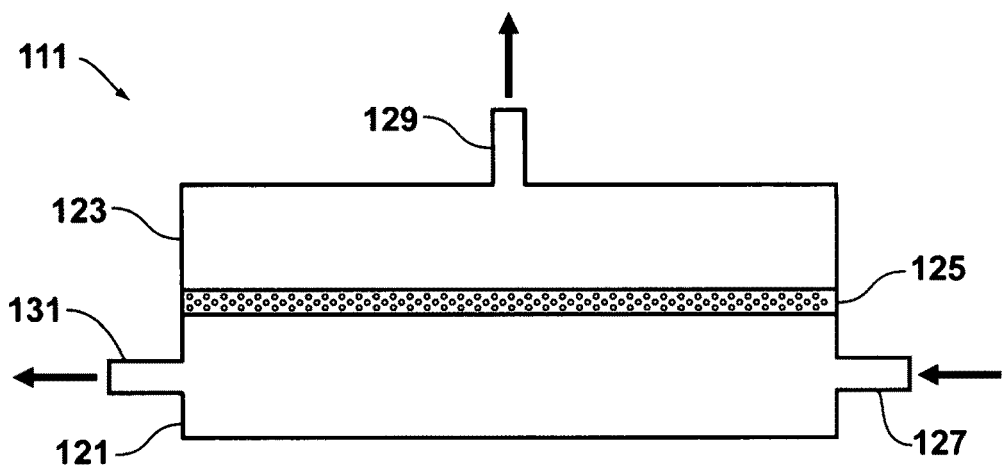
FIG. 2 is an illustration of a particular, non-limiting embodiment of a separator for the hydrogen generator of FIG. 1.

FIG. 2 shows the separator 111 of the hydrogen generator of FIG. 1 in greater detail. In the particular embodiment depicted, the separator 111 comprises a first compartment 121 which is in communication with the reactor chamber 109 (see FIG. 1) by way of an inlet 127, and a second compartment 123 which is separated from the first compartment 121 by a suitable boundary 125 which is selectively permeable to hydrogen gas. The stream entering the separator 111 will typically comprise hydrogen gas, byproducts from the hydrogen evolution reaction, unreacted materials, and water. As the stream enters the separator 111, the hydrogen gas component flows into the second compartment 123 by way of the boundary 125, and is thus separated from the stream. The hydrogen gas is withdrawn from the second compartment 123 by way of outlet 129. The remaining components of the stream are forced out of outlet 131 and into the third chamber 113. This may be accomplished, for example, by the pressure created by the hydrogen gas evolved in the reaction chamber 109, through gravity, or through other suitable means.

In some embodiments, the shape of the first compartment 121 may be selected to promote plug flow in the separator. Such flow can be advantageous in that it can permit direct contact between the hydrogen gas and the boundary 125. This, in turn, can provide almost instantaneous egress of the hydrogen gas through the boundary 125.

The boundary 125 in the separator may comprise various materials which are selectively permeable to hydrogen gas, and which are preferably impermeable to the reaction byproducts, reactants, and/or water. These include, but are not limited to, porous or mesh materials comprising ceramics, plastics, polymers, non-wovens, wovens, textiles, fabrics, carbons, carbon-fibers, ion exchange resins, metals, alloys, wires, meshes, foamed glass, glass frits, and combinations thereof. Preferably, the porous or mesh material is in the form of a sheet or flat membrane which may include, for example, nylon screens and stainless steel screens. Preferably, the porous or mesh material comprises expanded polytetrafluoroethylene.

Figure 3:
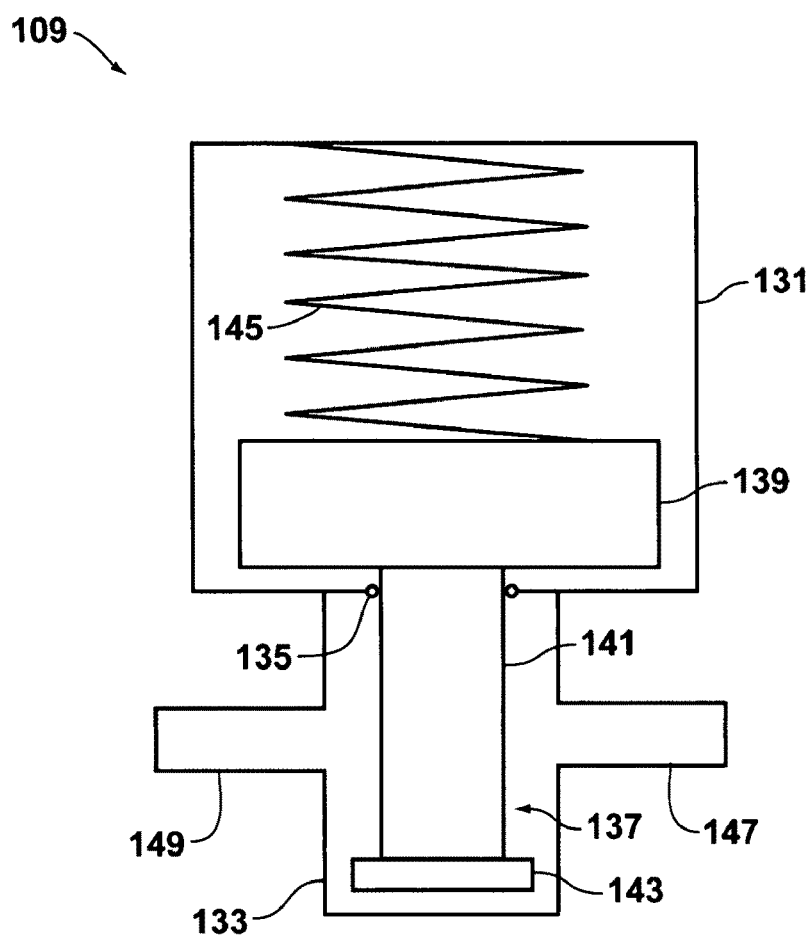
FIG. 3 is an illustration of a particular, non-limiting embodiment of a catalytic reactor of the hydrogen generator of FIG. 1 shown in a first state in which hydrogen is being actively generated.
Figure 4:
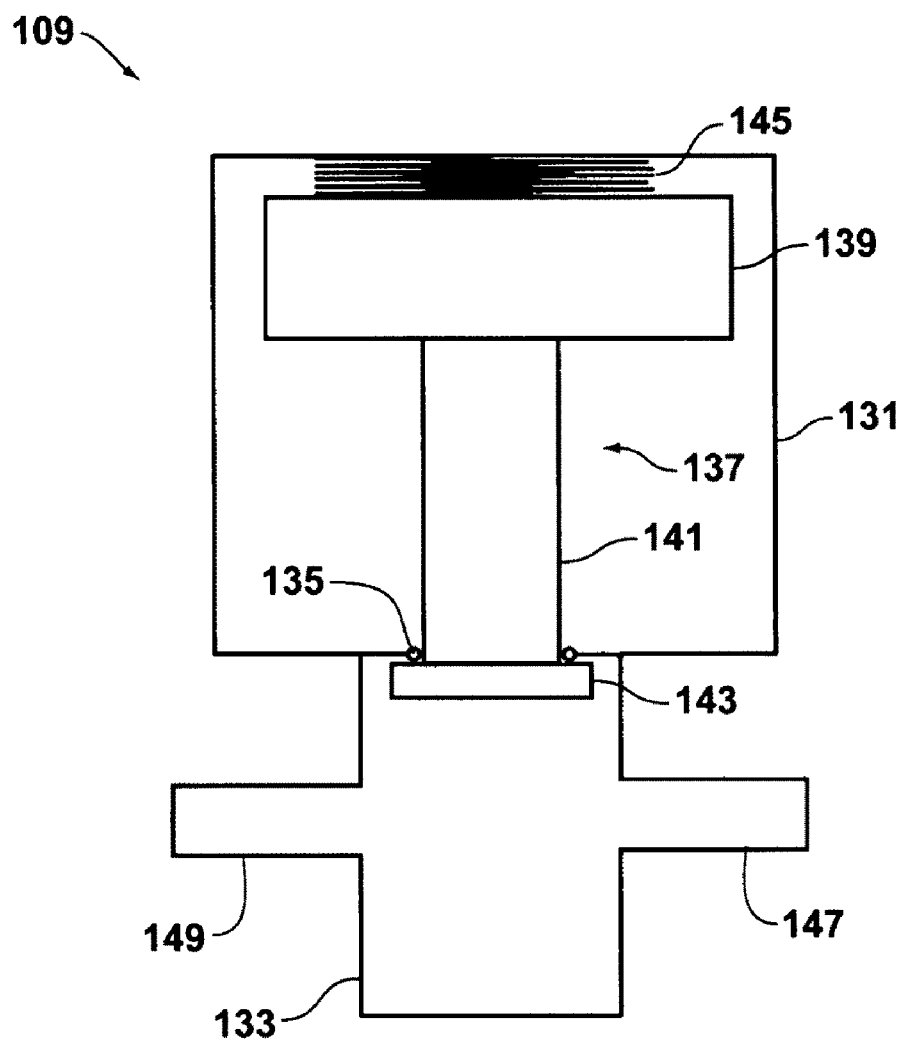
FIG. 4 is an illustration of the catalytic reactor of FIG. 3 shown in a second state in which the generation of hydrogen has been terminated.

FIGS. 3-4 show the catalyst reactor 109 of the hydrogen generator of FIG. 1 in greater detail. The catalytic reactor 109 comprises a housing having first 131 and second 133 chambers which are in communication with each other by way of a central aperture equipped with a seal 135. A piston 137 is provided which comprises a first plug 139 disposed in the first chamber 131 to which is attached a catalytic rod 141. The catalytic rod 141 terminates in a second plug 143. The piston is suspended from a spring 145 which is housed in (and preferably attached to a wall of) the first chamber 131. The second chamber 133 of the housing is provided with an inlet 147 and an outlet 149.

In use, when the generation of hydrogen gas is desired, the catalytic rod 141 is disposed in an orientation in which it is extended into the second chamber 133 as shown in FIG. 3. The first plug 139 arrests the movement of the piston 137 at the appropriate point of this operation, and the spring 145 provides a suitable force to hold the piston 137 in place. In this position, the active surface of the catalytic rod 141 contacts the fluidic stream which enters the second chamber 133 of the catalytic reactor 109 by way of inlet 147 and which comprises a mixture or slurry of the liquid from the first chamber 103 (see FIG. 1) and the hydrogen-containing material from the second chamber 105. The fluidic stream reacts in the presence of the catalyst to generate hydrogen gas and reaction byproducts. The hydrogen gas and reaction byproducts then exit the second chamber 133 of the catalytic reactor 109 by way of outlet 149.

When the demand for hydrogen gas ceases, the flow of gas from the hydrogen generator 101 is terminated. This may be accomplished, for example, through the provision of a valve or other suitable device downstream from the outlet 129. As a result, pressure from accumulating hydrogen gas begins to rise in the second chamber 133 of the catalytic reactor 109. As the pressure rises, the catalytic rod 141 is pushed into the first chamber 131 of the catalytic reactor 109 as shown in FIG. 4, thereby terminating the evolution of hydrogen gas. The second plug 143 arrests the movement of the piston 137 at the appropriate point of this operation. The spring 145 disposed in the first chamber 131 of the catalytic reactor 109 provides a restoring force to the piston 137 when pressure abates, so that the generation of hydrogen gas can resume.

It will be appreciated that, in various embodiments made in accordance with the teachings herein, the second plug 143 may be replaced by other features which accomplish a similar end. Thus, for example, in some embodiments, the longitudinal dimension of the catalytic rod 141 may be selected to be slightly longer than the height of the first chamber 131 so that the catalytic rod 141 cannot be withdrawn completely into the first chamber 131. In other embodiments, the catalytic rod 141 (or a portion thereof) may be wedge-shaped, and the first chamber 131 may be equipped with a complimentary-shaped aperture into which the catalytic rod 141 is withdrawn. The surfaces of the aperture will then abut the surfaces of the catalytic rod 141 when the catalytic rod 141 is withdrawn sufficiently far into the aperture, thereby arresting its further progress.

It will be appreciated from the foregoing that, in some embodiments, a sufficiently good seal may be desired between the first 131 and second 133 chambers so that a sufficient pressure differential will exist to drive the piston 137 in response to the pressure within the first chamber 131. In some embodiments, a suitable seal may be provided through the provision of an elastomeric material, an o-ring, or a lubricant. In some embodiments, the seal and/or the adjacent features of the housing may be further adapted to remove or abrade materials adhering to the surface of the catalytic rod 141 so that a fresh catalytic surface will be provided when the resumption of hydrogen generation is desired. In other embodiments, this function may be performed by a separate blade or protrusion disposed within the catalytic reactor 109 which preferably slidingly engages the catalytic surface.

In various embodiments, the first chamber 103, the second chamber 105, and/or the third chamber 113 may all be equipped with means to apply pressure to the contents therein. In the case of the first chamber 103, a positive pressure within this chamber is desirable in order to provide a ready flow of liquid into the second chamber 105. Similarly, it will frequently be desirable to subject the hydrogen-containing material disposed in the second chamber to pressure so as to force that material against the interface used to mix the liquid from the first chamber 103 with the hydrogen-containing material disposed in the second chamber 105. In various embodiments of the hydrogen generators disclosed herein, this pressure may be provided by various means, including springs, elastic bands, elastomeric materials, aerosols, or the like.

Figure 5:
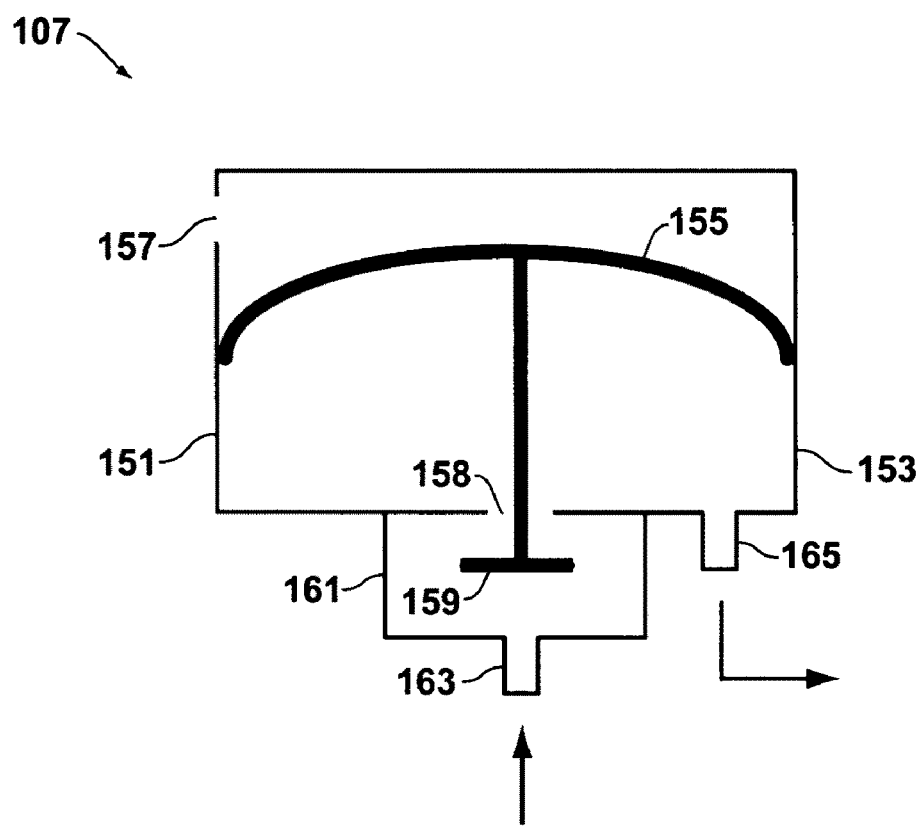
FIG. 5 is an illustration of a particular, non-limiting embodiment of a shut-off valve for the hydrogen generator of FIG. 1.

FIG. 5 depicts the details of the shut-off valve 107. The shut-off valve 107 comprises a first compartment 153 within which is seated a membrane 155. The first compartment is equipped with an opening 157 to the ambient environment. A plug 159 is attached to the membrane 155, and is housed within a second compartment 161 equipped with an inlet 163. The housing 151 is likewise equipped with an outlet 165 which is in fluidic communication with the inlet 163 when the valve 107 is in the open state (that is, when the plug 159 is dislodged from the opening 158). Similarly, the outlet 165 is no longer in fluidic communication with the inlet 163 when the valve 107 is in the closed state (that is, when the plug 159 is seated on the opening 158). By operating in this manner, the valve 107 provides for a unidirectional flow of fluidic whenever the pressure at the inlet 163 exceeds the pressure at the outlet 165.

Figure 6:
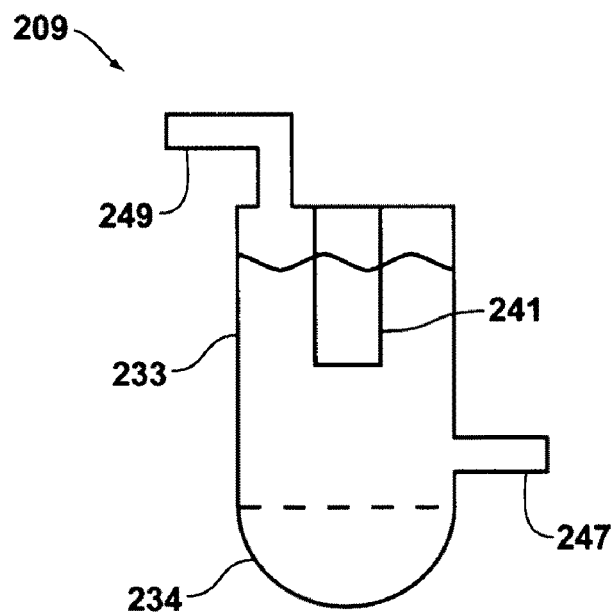
FIG. 6 is an illustration of a particular, non-limiting embodiment of a catalytic reactor useful in a hydrogen generator of the type depicted in FIG. 1, shown in a first condition in which a steady demand for hydrogen gas exists.
Figure 7:
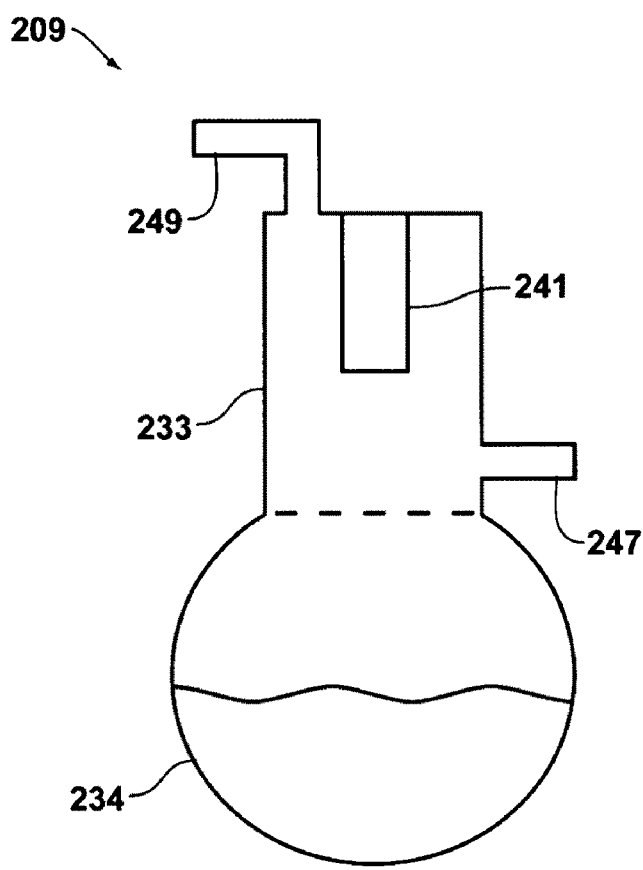
FIG. 7 is an illustration of the catalytic reactor depicted in FIG. 6, and shown in a second condition in which the demand for hydrogen gas has abated.

FIGS. 6-7 illustrate another particular, non-limiting embodiment of a catalytic reactor made in accordance with the teachings herein. The catalytic reactor 209 depicted therein comprises a housing 233 which terminates in an elastomeric portion 234. The housing is equipped with an inlet 247 to deliver reactants into the reactor 209. The reactants react in the presence of a catalyst 241 to generate hydrogen gas. The housing 233 is also equipped with an outlet 249 to remove reaction byproducts and hydrogen gas from the reactor 209.

In use, when a demand for hydrogen gas exists, a fluidic flow of reactants is maintained within the catalytic reaction chamber 209, and the elastomeric portion 234 of the reaction chamber 209 remains at a minimum volume as shown in FIG. 6. When the demand for hydrogen gas begins to abate, the pressure within the catalytic reaction chamber 209 begins to rise, and the elastomeric portion 234 of the reaction chamber 209 begins to expand as shown in FIG. 7. Eventually, when the flow rate of fluid at the outlet 249 drops sufficiently low in comparison to the rate at which hydrogen gas is being generated, the expansion of the elastomeric portion 234 of the reaction chamber 209 withdraws the fluid flow from contact with the catalyst 241, thereby arresting the hydrogen evolution reaction. It will be appreciated that, when the demand for hydrogen gas increases again, the volume of the elastomeric portion 234 of the reaction chamber 209 decreases from the withdrawal of hydrogen gas to the point where the reactants are once again in contact with the catalyst 241, and the generation of hydrogen gas resumes. It will further be appreciated that the reactor design provides a ready supply of hydrogen gas at all times after initial start-up, thus accommodating the need for hydrogen on demand.

One skilled in the art will appreciate that a wide number of variations are possible to the embodiments depicted in FIGS. 6-7. For example, while the expandable portion 234 of the catalytic reaction chamber 209 is depicted as being spherical in the device of FIGS. 6-7, a similar effect can be achieved with expandable portions that are of various other geometries. For example, rather than being spherical, the expandable portion could be tubular or could have a bellows-like configuration. Also, various embodiments are possible wherein the catalyst is attached to one or more surfaces of the expandable region 234 and is withdrawn from the fluid flow as the expandable portion expands under the accumulation of hydrogen gas. Moreover, while the inlet 247 and outlet 249 are arranged on opposing sides of the reaction chamber 209, it will be appreciated that embodiments are possible wherein the inlet 247 and outlet 249 are arranged on the same side of the reaction chamber 209.

In other variations of the embodiment depicted in FIGS. 6-7, the catalyst may be suspended within a cage which is disposed within the expandable region 234 such that the cage separates the catalyst from any surface the cage is resting upon by a certain minimum distance. The cage may be permitted to move freely within the catalytic reaction chamber 209. In such an embodiment, when the expandable portion 234 expands under the influence of accumulating hydrogen gas, the increased volume of the reaction chamber 209 will withdraw the fluid containing the reactants from contact with the catalyst, thus halting the hydrogen generation process. Conversely, as hydrogen gas is withdrawn from the reaction chamber 209 as demand increases again, the reducing volume of the reaction chamber 209 will again bring the fluid into contact with the catalyst. Preferably, the reaction chamber 209 in such an embodiment is essentially spherical in shape, and has an outlet which is covered with a hydrogen-permeable, water-impermeable membrane.

In variations of the foregoing embodiment, a porous and/or liquid permeable material may be used in place of the cage. This material is preferably adapted to permit a mixture of a hydrogen-containing material and a liquid medium to contact the catalyst, while spacing the catalyst apart from the surface of the reaction chamber the material is resting on. Thus, for example, the catalyst may be suspended, embedded or encapsulated within a porous and/or liquid permeable medium, such as, for example, foamed glass or foamed plastic. In a preferred embodiment of this type, the catalyst is disposed at the center of a sphere comprising the porous and/or liquid permeable material. The material may be hydrophobic or hydrophilic.

Figure 8:
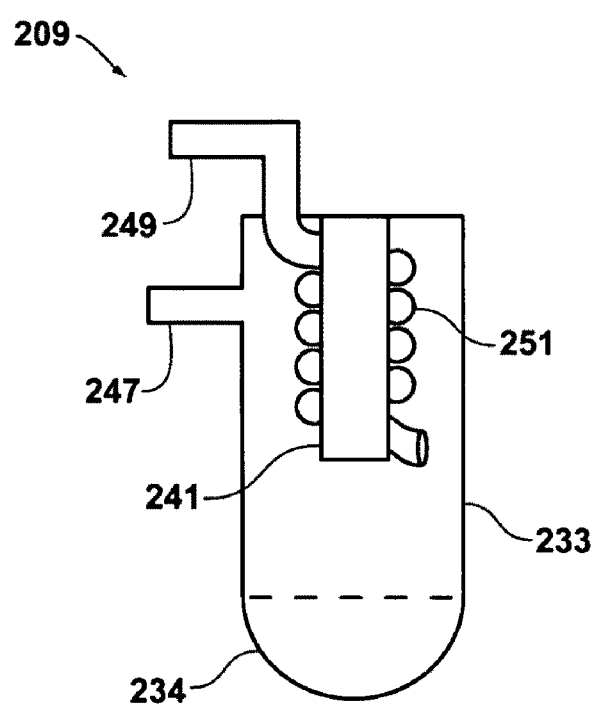
FIG. 8 is an illustration of a particular, non-limiting embodiment of a catalytic reactor useful in the hydrogen generators described herein.

FIG. 8 illustrates another particular, non-limiting embodiment of a catalytic reaction chamber 209 suitable for use in the hydrogen generators described herein. The catalytic reaction chamber 209 is equipped with a tortuous pathway so as to subject the reactants to an extended residence time during which they are in contact with the catalyst 241. In the particular embodiment depicted, the outlet from the reaction chamber is in fluidic communication with a helical winding of tubing 251 that terminates inside of the catalytic reaction chamber 209. A portion of the wall of the tubing is open to the catalyst. As fluid is drawn out of the inlet 249, it flows through the helical winding 251 and, in so doing, is subjected to extended contact with the catalyst 241. This helps to ensure that the hydrogen evolution reaction is driven to completion.

Figure 9:
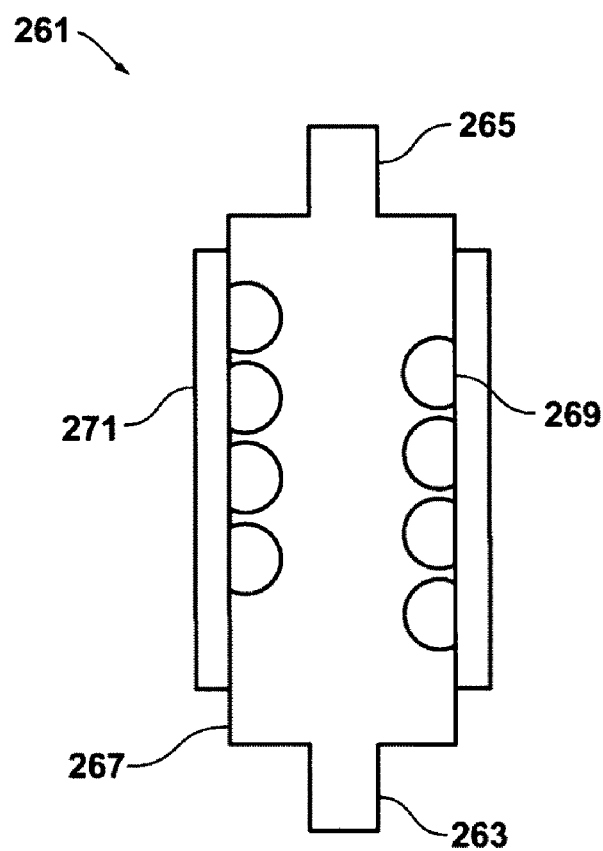
FIG. 9 is an illustration of a particular, non-limiting embodiment of a catalytic reactor useful in the hydrogen generators described herein.

FIG. 9 illustrates another particular, non-limiting embodiment of a catalytic reaction chamber 209 equipped with a tortuous pathway so as to subject the reactants to an extended residence time during which they are in contact with the catalyst 241. The catalytic reaction chamber of FIG. 9 is similar in most respects to the catalytic reaction chamber of FIG. 8, except that, rather than using a helical winding of tubing to increase fluid residence time, a series of helical grooves 269 are employed for this purpose. The grooves 269 are sealed off from one side with a layer 271 of a suitable material to form closed passageways. The surfaces of the helical windings and/or the layer 271 are coated with a suitable catalyst to promote the hydrogen evolution reaction.

In some cases, the catalytic reactor 261 of FIG. 9 may offer greater ease of manufacturability, due to the ease with which catalyst may be deposited directly on the surfaces that defined the tortuous pathway. For example, the core of the catalytic rod can be readily made from moldable plastics. Once formed, catalyst can be deposited on the surfaces of the helical windings through, for example, solution-based deposition processes that are well known in the art. Alternately or in conjunction with the foregoing, catalyst may be deposited on the surface of the layer 271 through various processes known to the art. This layer may then be disposed about the outer surfaces of the core in a variety of ways. For example, the layer 271 may be formed as the tape which is wound around the core, and which may be hydrogen permeable. The layer 271 may also be formed as a skirt of heat-shrinkable plastic or other suitable material which is then shrunk into place about the core through exposure to a suitable heat source.

Figure 10:
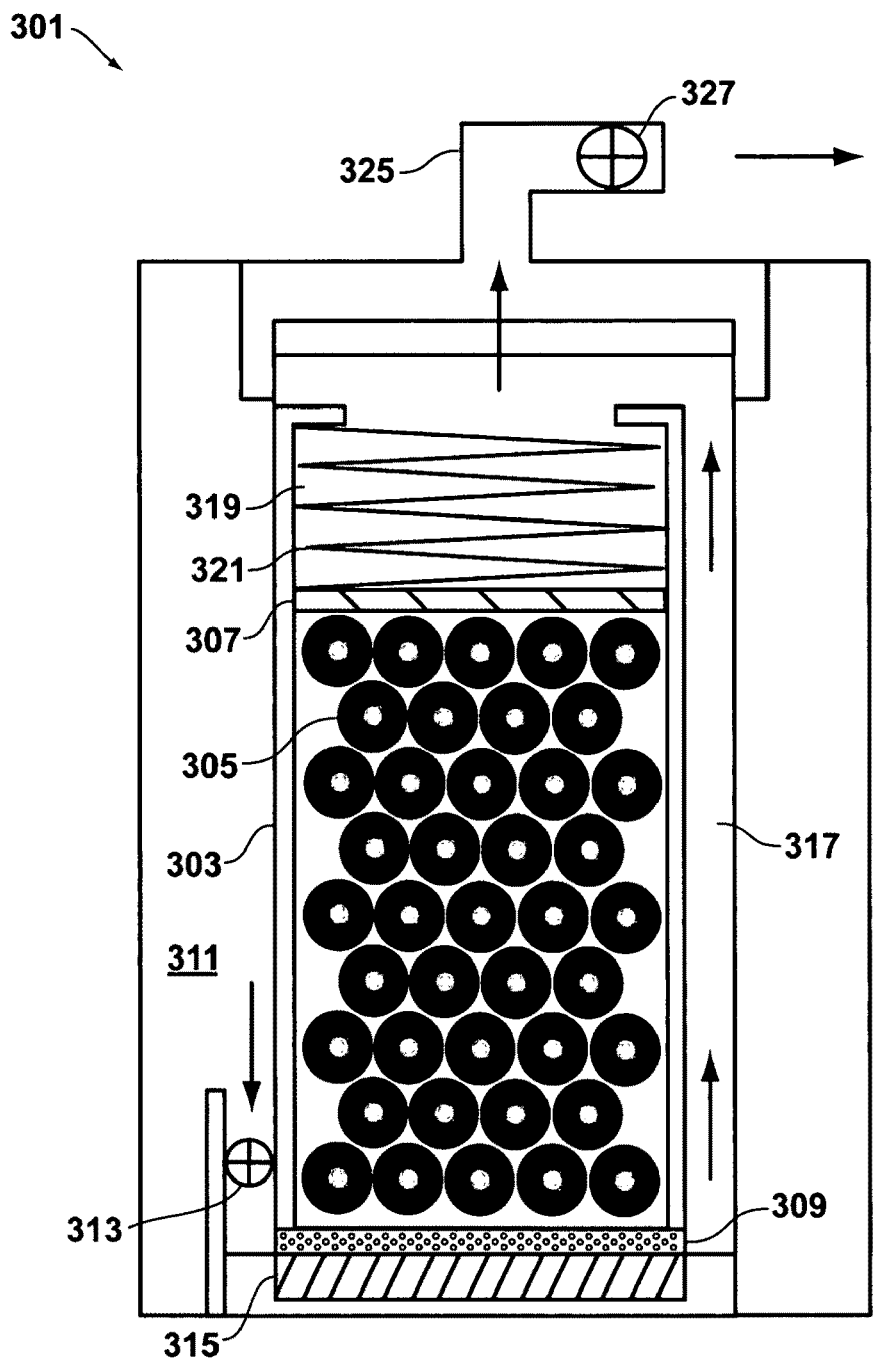
FIG. 10 is an illustration of a particular, non-limiting embodiment of a hydrogen generator in accordance with the teachings herein.

FIG. 10 depicts a further particular, non-limiting embodiment of a hydrogen generator made in accordance with the teachings herein. The hydrogen generator 301 comprises a central chamber 303 which is charged with sodium borohydride 305 or another suitable hydrogen-containing material. A piston 307 is provided on one end of the chamber and exerts a compressive force against the sodium borohydride 305. In the particular embodiment depicted, the piston 307 is spring driven, though one skilled in the art will appreciate that the piston 307 may be driven pneumatically or by any other suitable means as is known to the art.

The compressive force exerted against the sodium borohydride 305 by the piston 307 causes the sodium borohydride 305 to be pressed against a porous frit 309 disposed on an opposing side of the central chamber 303 from the piston 307. The frit 309 is in combination with a water reservoir 311 by way of a valve 313. In the particular embodiment depicted, the water reservoir 311 is cylindrical and forms the outer surface of the device. However, one skilled in the art will appreciate that water reservoirs of a wide variety of geometries and configurations may be utilized in the device depicted and in variations thereof. A layer of catalyst 315 is provided on the surface of the frit 309 opposite the sodium borohydride 305.

In use, when a demand for hydrogen exists, water is withdrawn from the reservoir 311 by way of the valve 313 and wicks across the porous frit 309, where it dissolves a portion of the sodium borohydride 305. The sodium borohydride solution then reacts in the presence of the catalyst 315 to generate hydrogen gas. In some embodiments, the layer of catalyst 315 and/or the porous frit 309 may be serpentine in shape to increase the residence time of the solution during which it is in contact with the catalyst 315, thereby helping to ensure that the hydrogen evolution reaction runs to completion. In other embodiments, a similar result may be achieved through proper selection of the dimensions of the device. In still other embodiments, the catalyst may be combined or incorporated into the porous frit 309.

As the reacted solution exits the porous frit 309, it flows along a channel 317 provided along one wall of the device. The channel 317 is an open communication with a compartment 319 of the device that houses the spring 321. As the sodium borohydride is depleted, this compartment 319 increases in volume, thus providing a suitable storage location for the reaction byproducts.

A hydrogen-permeable membrane 323 is provided on one end of the hydrogen generator 301. As hydrogen gas is generated, it flows through the channel 317 and exits the device via an outlet 325 controlled by a valve 327. In some embodiments, the hydrogen generator 301 may also be adapted to permit the flow of hydrogen gas across the porous frit 309 and through the piston 307, where it again exits the device via the hydrogen-permeable membrane 323. In such embodiments, the piston 307 may itself be a hydrogen-permeable membrane.

When hydrogen demand abates, or if the valve 327 is closed, hydrogen gas begins to accumulate in the device. The valve 313 is adapted such that the back pressure created by the accumulating hydrogen gas closes the valve 313 when a sufficient pressure is attained. This, in turn, results in the cessation of water flow, and the accompanying termination of the hydrogen evolution reaction. In some embodiments, one or more compartments of the device may be equipped with an expandable volume to accommodate the increased pressure.

Figure 11:
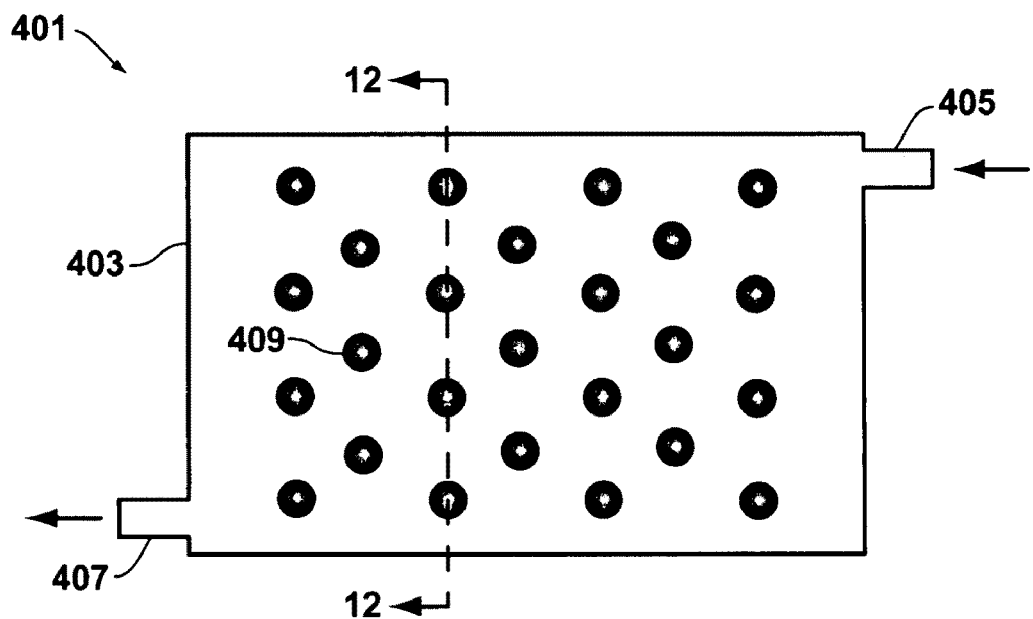
FIG. 11 is an illustration of a particular, non-limiting embodiment of a catalytic reactor useful in the hydrogen generators described herein.
Figure 12:
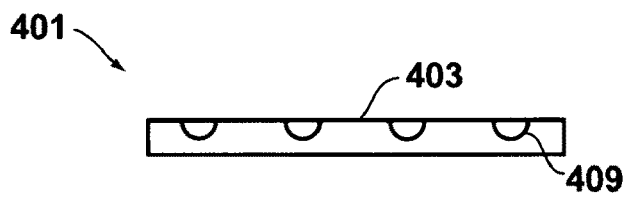
FIG. 12 is a cross-sectional view of the catalytic reactor of FIG. 11 taken along the line 12-12, and shown in a first state in which a steady demand for hydrogen gas exists.
Figure 13:
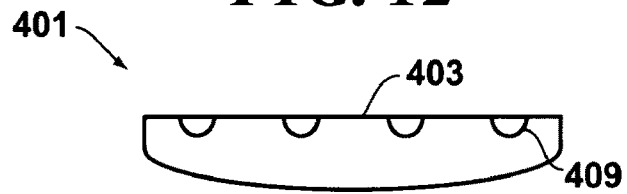
FIG. 13 is a cross-sectional view of the catalytic reactor of FIG. 11 taken along the line 12-12, and shown in a second condition in which the demand for hydrogen gas has abated.

FIGS. 11-13 depict a further particular, non-limiting embodiment of a catalytic reactor in accordance with the teachings. The catalytic reactor 401 depicted therein comprises a flat rectangular housing 403 equipped with an inlet 405 and an outlet 407. A plurality of catalytic bumps 409 are provided upon one major surface of the catalytic reactor (note that the opposing surface has been removed for illustration purposes). In the particular configuration depicted therein, the catalytic bumps 409 are arranged in a staggered fashion to ensure sufficient exposure to the catalyst of the fluid flowing through the reactor 401.

When a sufficient demand for hydrogen exists, the catalytic reactor 401 is in the state depicted in FIG. 12, in which the two major opposing surfaces of the reactor 401 are sufficiently close so as to ensure exposure of the fluid flowing through the reactor 401 to the catalyst 409, thereby ensuring the continuing evolution of hydrogen gas. By contrast, when the demand for hydrogen gas abates, the pressure of the accumulating gas causes the two major surfaces of the reactor 401 to move apart from each other, thereby removing the contact between the catalyst bumps 409 and the fluid flow, and terminating the hydrogen evolution reaction.

One skilled in the art will appreciate that numerous variations are possible to the embodiment depicted in FIGS. 11-13. For example, in the embodiment depicted therein, the major surface devoid of catalyst bumps is depicted as the surface that undergoes deformation to withdraw the catalyst from contact with the fluid stream. However, it will be appreciated that either or both of these major surfaces may undergo suitable deformation to accomplish this end. It will further be appreciated that the catalyst may be disposed within the reactor in various ways. For example, the catalyst may be disposed as one or more lines upon one or both major surfaces of the reactor. The catalyst may also be disposed is a uniform coating on one or both major surfaces of the reactor.

Figure 14:
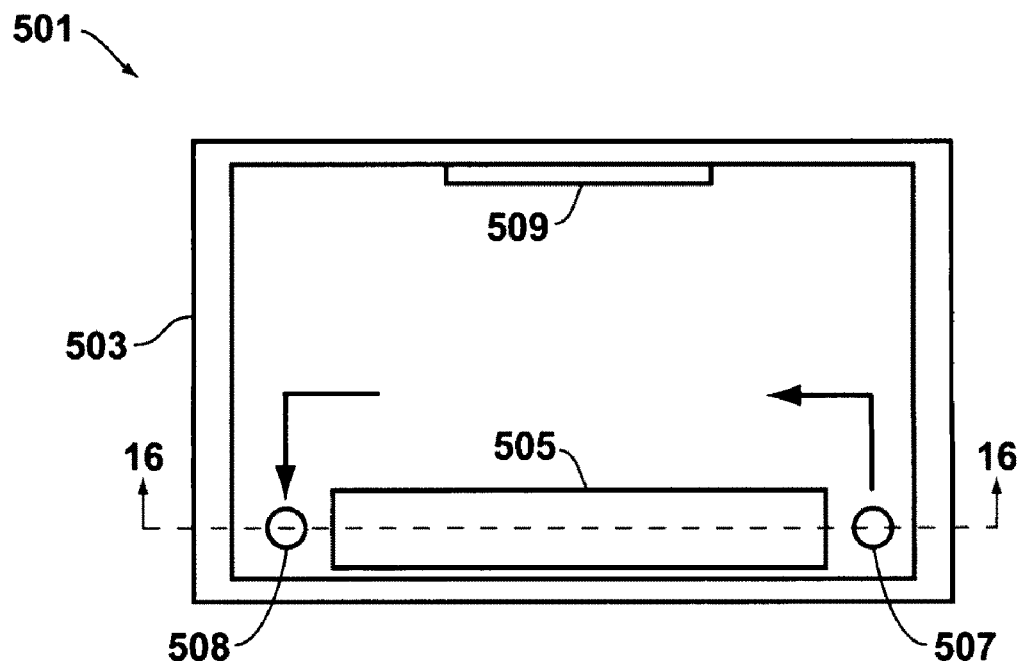
FIG. 14 is an illustration of a particular, non-limiting embodiment of a catalytic reactor useful in the hydrogen generators described herein, depicted in a first state in which hydrogen gas is being generated.
Figure 15:
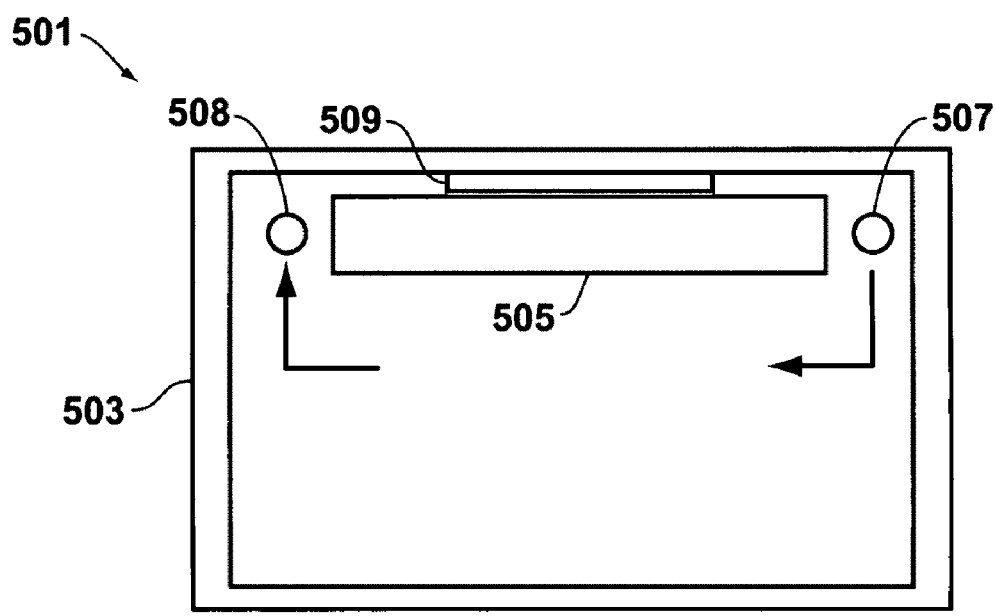
FIG. 15 is an illustration of the catalytic reactor of FIG. 14, depicted in a second state in which the generation of hydrogen gas has been terminated.
Figure 16:
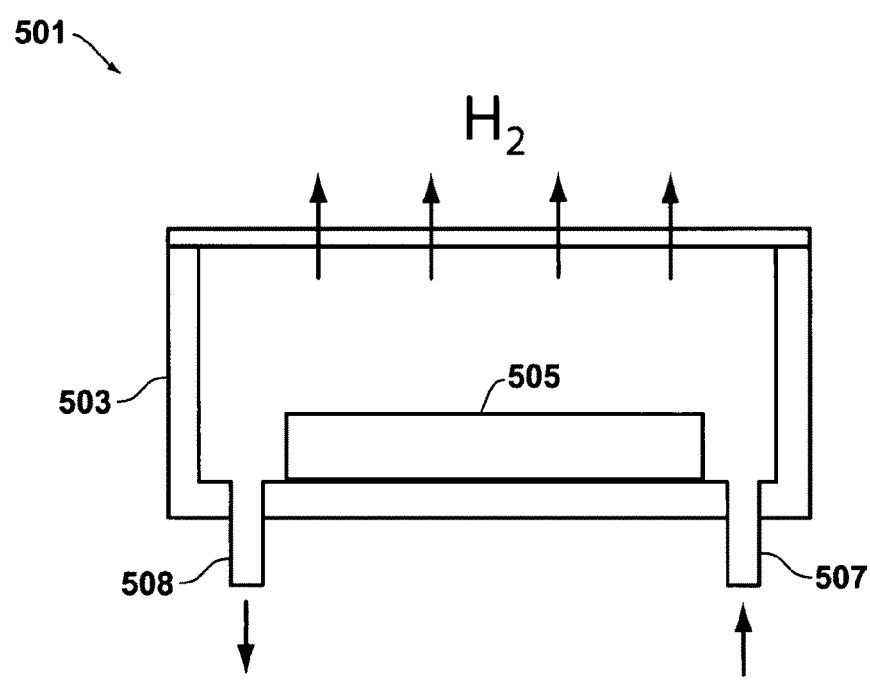
FIG. 16 is a side view of the catalytic reactor of FIG. 14.

FIGS. 14-16 illustrate another particular, non-limiting embodiment of a catalytic reactor in accordance with the teachings herein. The catalytic reactor 501 depicted therein comprises a moveable wall 503 which encloses the interior of the reactor 501 and which is disposed about a stationary plug 505. An inlet 507 for introducing a reactant solution into the reactor 501, and an outlet 508 for removing byproducts from the reactor 501, are disposed on opposing sides of the plug 505. A layer of catalyst 509 is disposed on the wall 503 between the inlet 507 and the outlet 508.

FIG. 14 shows the catalytic reactor 501 in a first orientation in which the movable wall 503 has been placed such that the layer of catalyst 509 is apart from the plug 505. In this orientation, as liquid reactant enters the reaction chamber, it is forced by the plug 505 and the movable wall 503 to flow along a first course that brings it into contact with the catalyst 509. The liquid reactant reacts in the presence of the catalyst 509 to generate hydrogen gas. Hence, the first orientation corresponds to the "on" position of the reactor 501.

FIG. 15 shows the catalytic reactor 501 in a second orientation in which the movable wall 503 has been moved such that the plug 505 is in contact with the layer of catalyst 509. In this orientation, as liquid reactant enters the reaction chamber, it is forced by the plug 505 and the movable wall 503 to flow along a second course that prevents it from coming into contact with the catalyst 509. The liquid reactant is thus unable to react to generate hydrogen gas. Hence, the second orientation corresponds to the "off" position of the reactor 501.

FIG. 16 shows a cross-sectional view of the catalytic reactor 501 of FIG. 14 taken along the LINE 16-16. As seen therein, the top of the reactor 501 is equipped with a hydrogen permeable membrane 511 that allows the hydrogen to exit the reactor, while leaving the reaction byproducts behind. Hence, a pure stream of hydrogen is extracted across the membrane. Various conduits and other such devices may be provided to collect and/or route the extracted hydrogen to a desired location.

It will be appreciated from the above that the reactor 501 depicted in FIGS. 14-16 operates to control the hydrogen evolution reaction by exposing the catalyst 509 to the liquid reactant when the generation of hydrogen gas is desired, and by essentially removing the catalyst 509 from the reaction chamber when it is desired to cease the generation of hydrogen gas. The catalytic reactor 501 may be incorporated into a hydrogen generator or other such device which provides other functionalities, such as control over the flow of liquid reactant.

In several of the embodiments described above, pressure from accumulating hydrogen gas is utilized to remove the catalyst from the reactant solution, thereby arresting the evolution of hydrogen gas. However, one skilled in the art will appreciate that a similar technique may be utilized to remove one of the other components necessary to the hydrogen evolution reaction to achieve a similar effect. For example, such a technique may be utilized to physically remove the hydrogen-containing material from the reaction zone.

Figure 17:
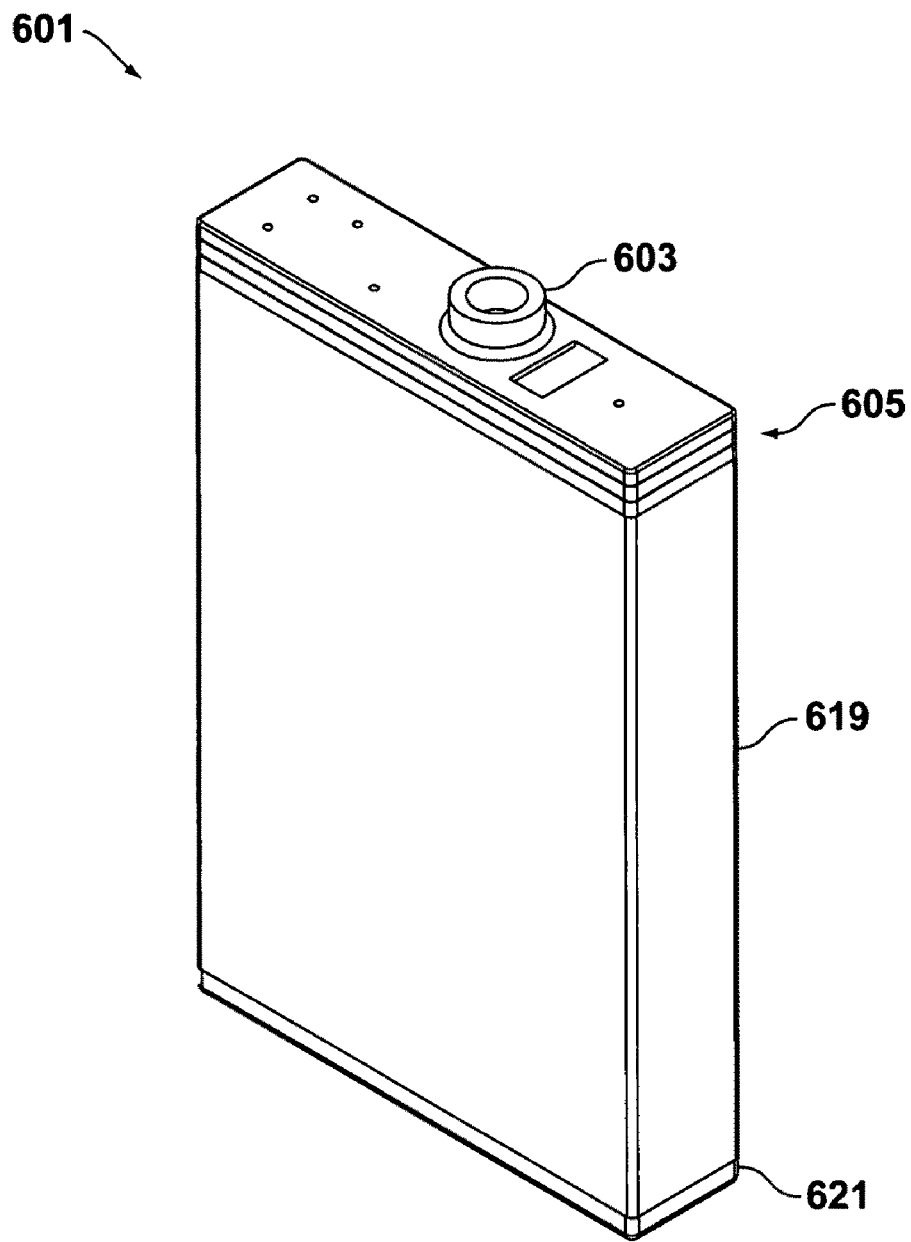
FIG. 17 is an illustration of a particular, non-limiting embodiment of a hydrogen generator in accordance with the teachings herein.

FIG. 17 illustrates a further particular, non-limiting embodiment of a hydrogen generator 601 made in accordance with the teachings herein. In the particular embodiment depicted, the hydrogen generator is essentially rectangular in shape. In a typical embodiment, this hydrogen generator has a height of about 3 inches, a width of about 2 inches, and a thickness of about 0.5 inches. Of course, one skilled in the art will appreciate that the hydrogen generator may be made in a variety of shapes and sizes, as taught herein. Hydrogen is produced on demand within the hydrogen generator 601, and is emitted from a hydrogen outlet 603 disposed on the top of the hydrogen generator 601. Various conduits and connectors (not shown) may be attached to the outlet 603 to conduct the generated hydrogen gas to the point of use.

Figure 18:
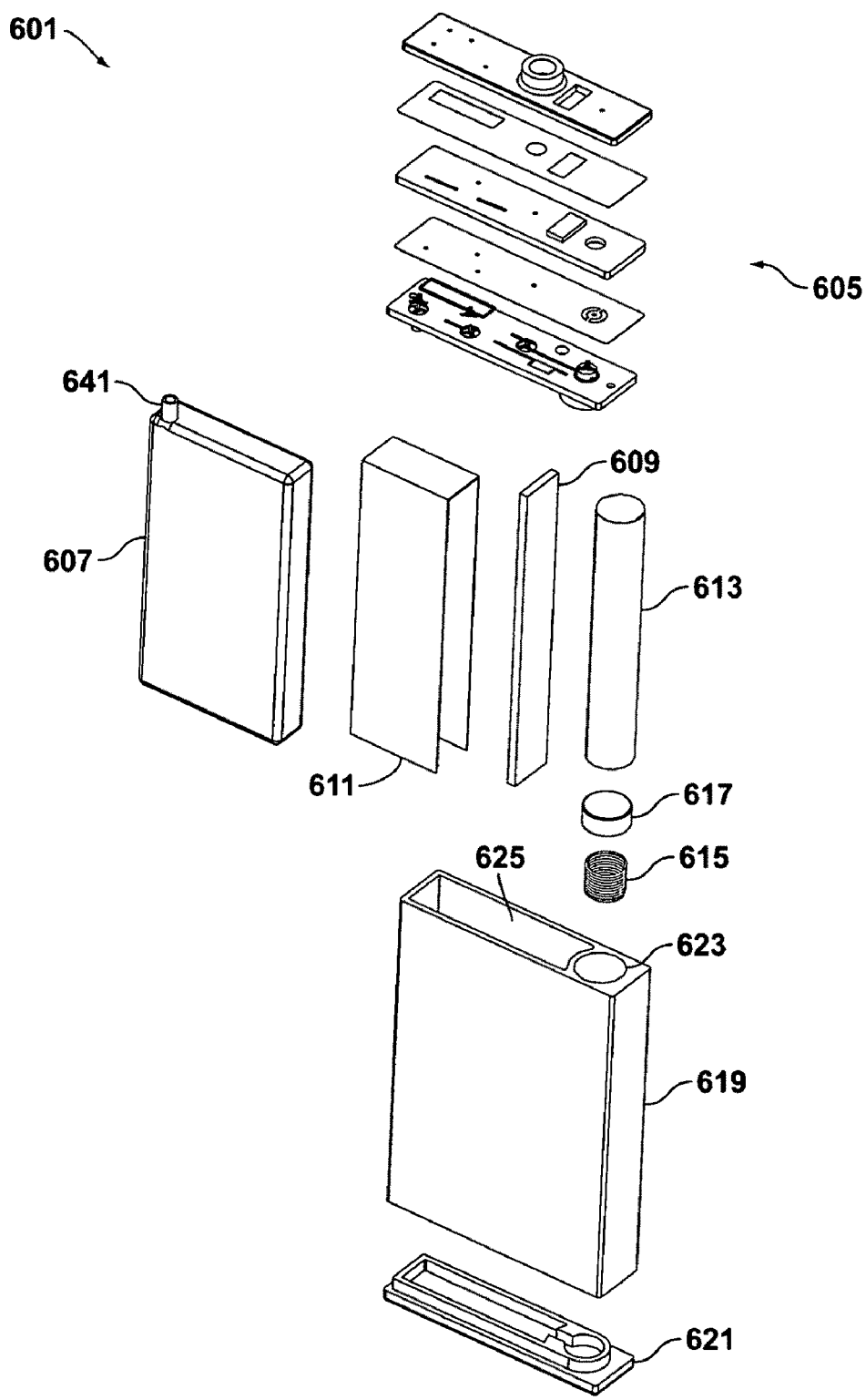
FIG. 18 is an exploded view of the hydrogen generator of FIG. 17.

The details of the hydrogen generator 601 of FIG. 17 may be further appreciated with respect to the exploded few of FIG. 18. As seen therein, the hydrogen generator 601 comprises a fluid manifold 605, a fluid bladder 607, a fluid bladder motivator 609, a residual hydrogen vent 611, a chemical hydride 613 (it is to be noted that this term is used here as shorthand for any of the various hydrogen-containing materials described herein), a spring 615, a piston 617, a chassis 619, and a base 621. Each of these components is described in greater detail below.

Figure 19:
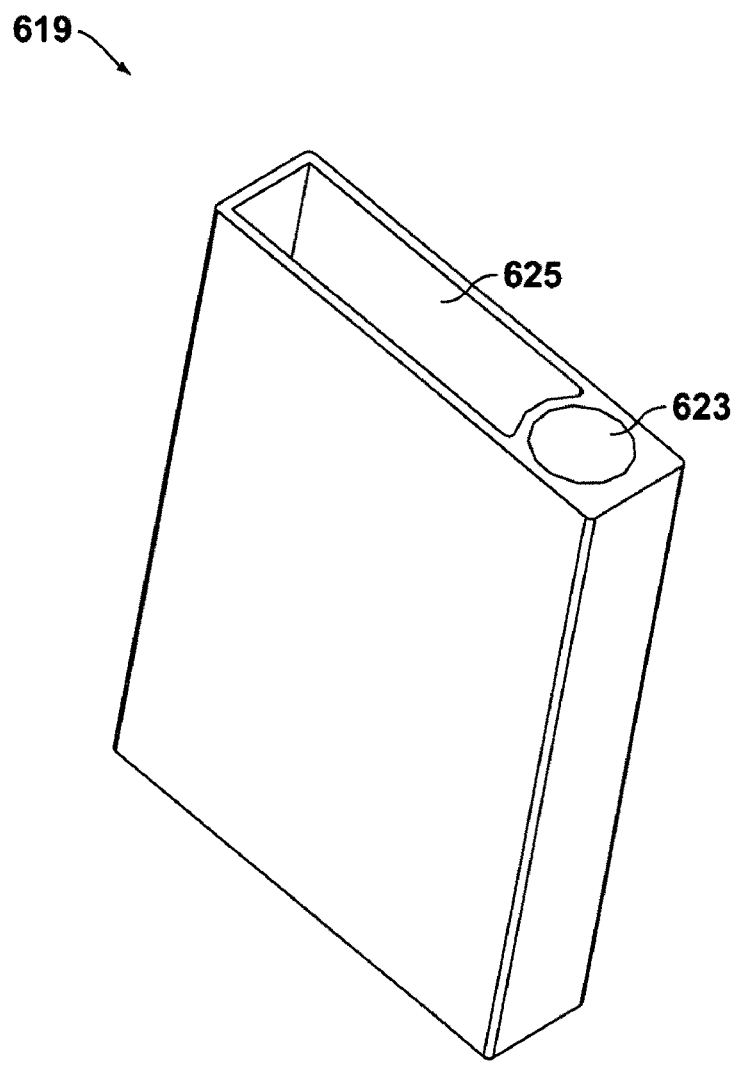
FIG. 19 is an illustration of the chassis of the hydrogen generator of FIG. 17.

FIG. 19 shows the chassis 619 in greater detail. As seen therein, in this particular embodiment, the chassis 619 comprises a first cylindrical compartment 623 which houses the chemical hydride 613, and a second rectangular compartment 625 which houses the fluid bladder 607, the fluid bladder motivator 609, and the residual hydrogen vent 611. It will be appreciated that, in other embodiments, the chassis 619 may have any number of compartments, and the shape and construction of each of these compartments may be adapted or optimized for their intended contents. Thus, for example, the geometry of the first compartment 623 may be modified to compliment the geometry of the chemical hydride 613 or the piston 617, either of which may have a wide varieties of geometries. Similarly, the second compartment may be further subdivided to provide a separate compartment for the residual hydrogen vent 611, and may be pressurized with air or a suitable gas to maintain pressure on the fluid bladder 607.

Figure 20:
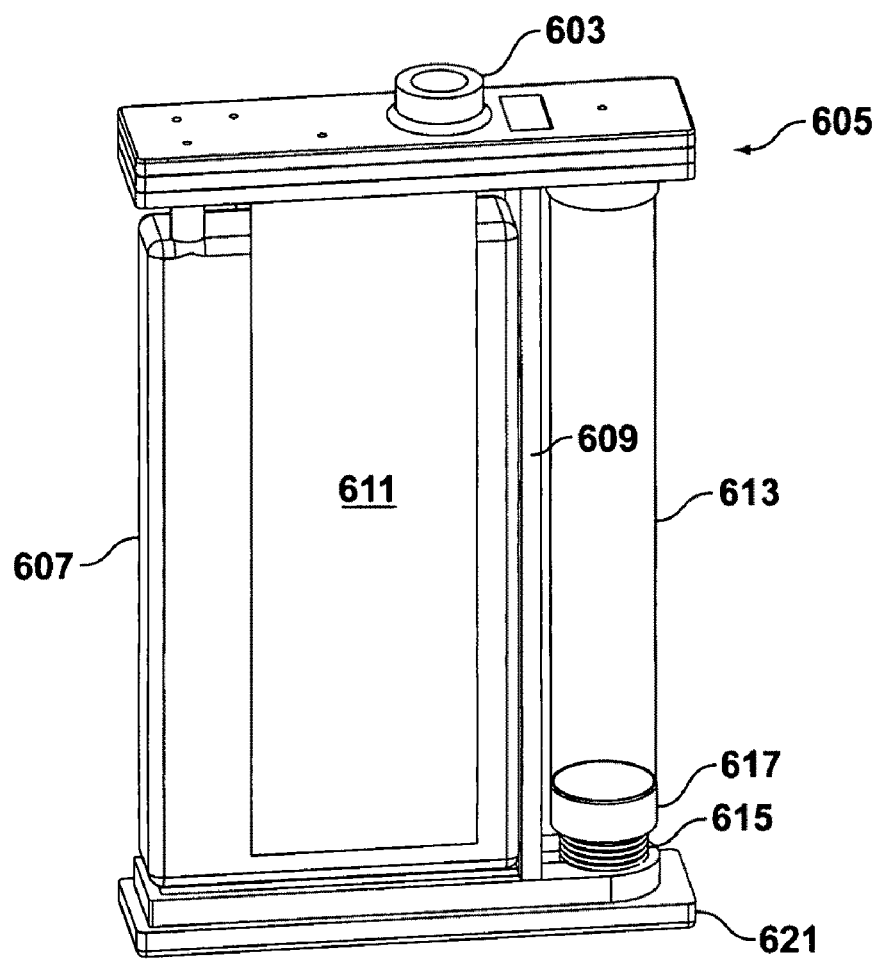
FIG. 20 is an illustration of the hydrogen generator of FIG. 17 with the chassis removed.
Figure 21:
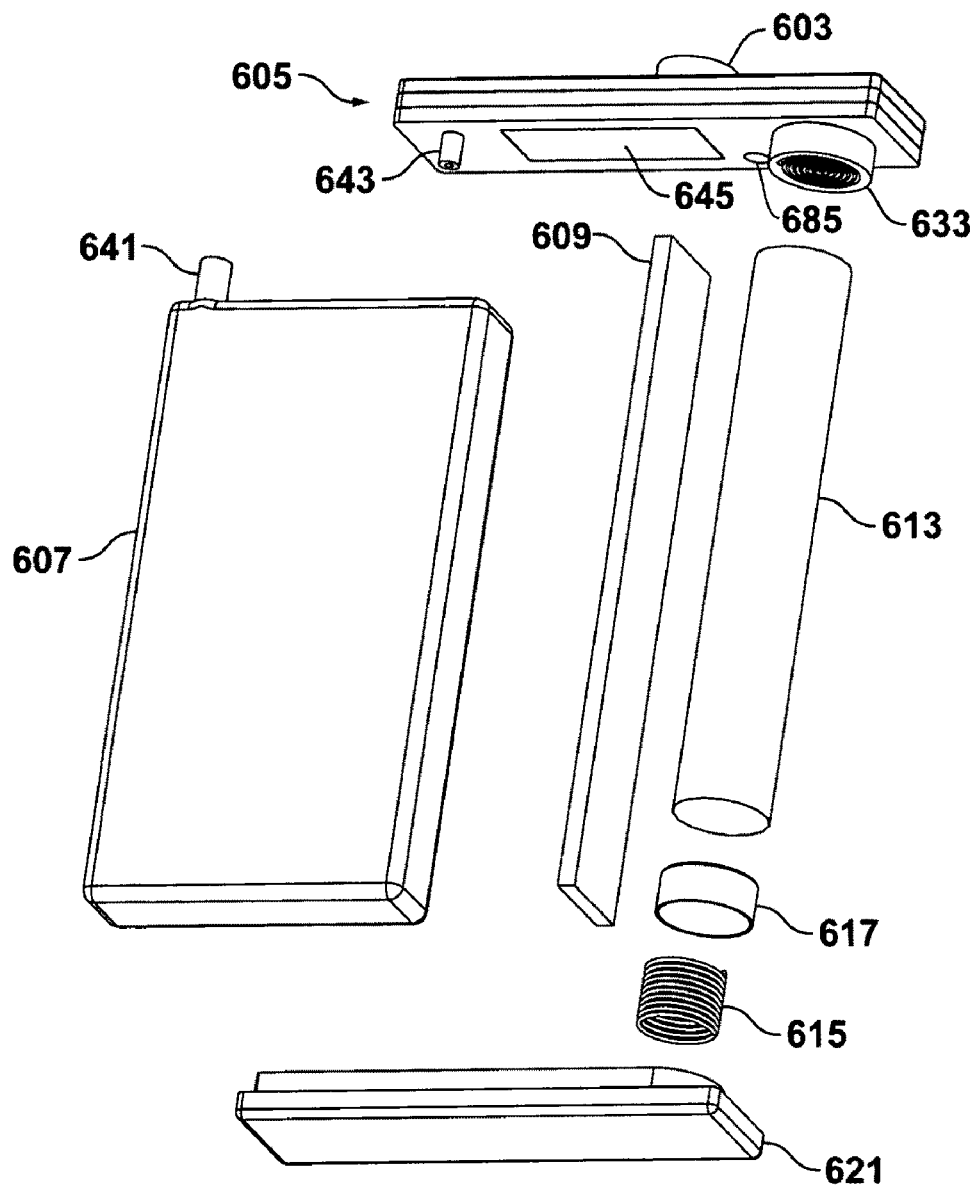
FIG. 21 is an exploded view of the hydrogen generator of FIG. 17 with the chassis removed.
Figure 22:
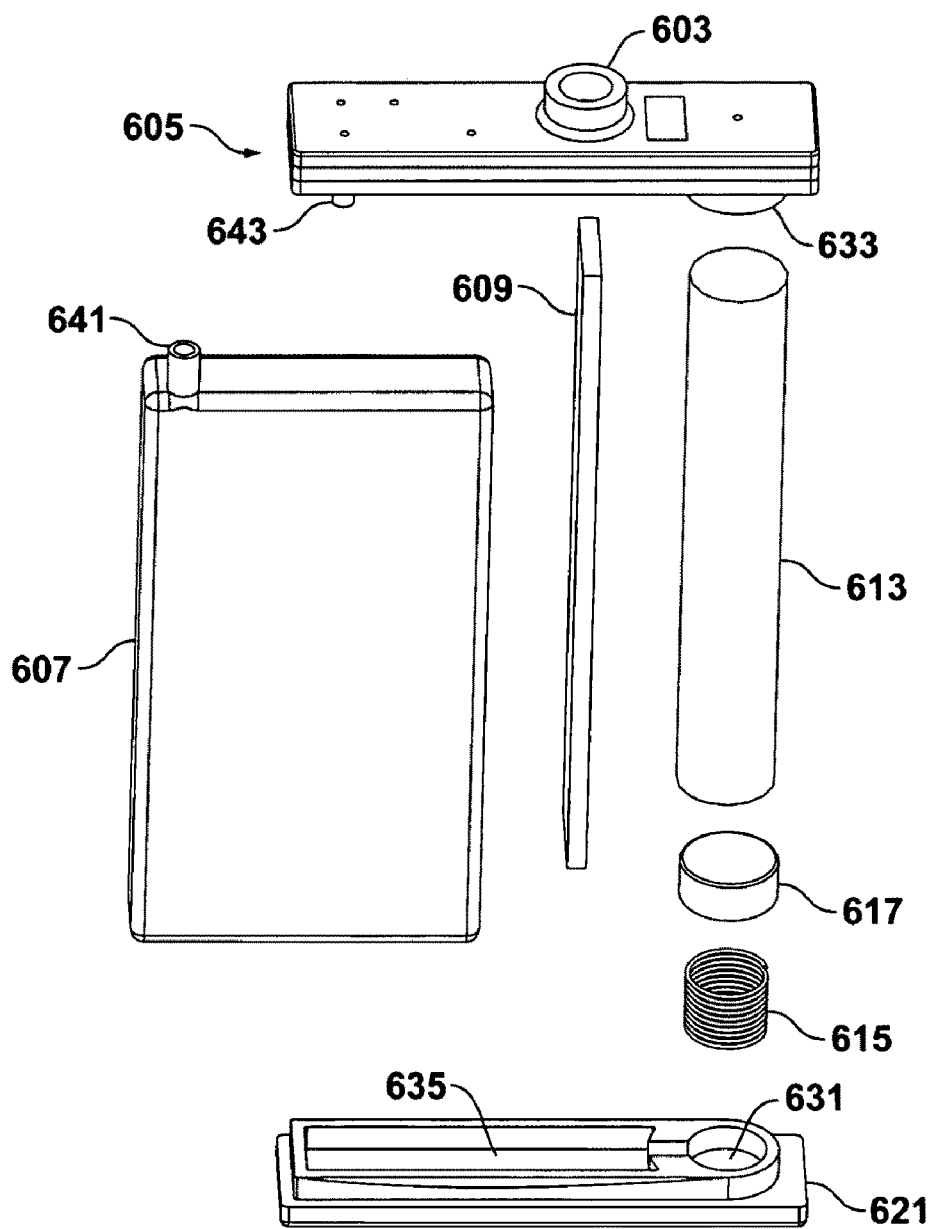
FIG. 22 is an exploded view of the hydrogen generator of FIG. 17 with the chassis removed.

FIGS. 20-22 illustrate the assembly of the various components of the hydrogen generator 601. The chassis 619 (see FIG. 18) has been deleted from FIGS. 20-23 for clarity of illustration. As seen therein, the base 621 is provided with a cylindrical aperture 631 (see FIG. 22) which provides a seat for one end of the spring 615. The piston 617 is mounted on the opposing end of the spring 615 and applies compressive force against one end of the chemical hydride 613. The opposing end of the chemical hydride 613 engages a hydride/water interface 633 (see FIG. 21) disposed on one surface of the fluid manifold 605. The chemical hydride 613 is maintained in proper alignment with respect to the hydride/water interface 633 by virtue of the complimentary shaped first cylindrical compartment 623 of the body 619 (see FIG. 19).

The base 621 is also provided with a rectangular aperture 635 (see FIG. 22) which seats one end of the fluid bladder 607 and the fluid bladder motivator 609. In some embodiments, the base may provide some of the functionalities typically provided by the fluid manifold 605, such as the residual pressure relief subsystem.

The fluid bladder 607, the fluid bladder motivator 609 and the residual hydrogen vent 611 are housed together in the rectangular compartment 625 (see FIG. 19) of the chassis 619 and are thus maintained in contact with each other, thereby allowing the fluid bladder motivator 609 to exert a compressive force against the fluid bladder 607.

The fluid bladder motivator 609 exerts force on the fluid bladder 607, preferably in a direction parallel to the force exerted by the generated gas pressure. In some embodiments, as in embodiments in which a water pumping mechanism is used within the fluid manifold, the fluid bladder motivator 609 may be deleted. The fluid bladder motivator 609 may be, for example, a compressed open-cell polymeric foam, a telescoping cylinder with aerosol or compressed gas, or an elastomeric component acting as a compression spring or extension spring (such as, for example, a rubber band constricting the water bladder). In some embodiments, the fluid bladder 607 itself can act as a motivator. Thus, for example, in some embodiments, the fluid bladder 607 may be fashioned as an expanded balloon which provides a contracting force on its contents.

As best seen in FIG. 21, the fluid bladder 607 is equipped with an outlet 641 which engages a port 643 in the fluid manifold 605 to provide for the flow of fluid from the fluid bladder 607 into the fluid manifold 605. Also, as described in greater detail below with respect to FIG. 31, the fluid manifold 605 is equipped with a port 645 (seen in greater detail in FIG. 44) which is in communication with the residual hydrogen vent 611 (see FIG. 20) and which provides a means by which residual hydrogen (generated by reaction byproducts or incompletely reacted materials) may be eliminated from the system. This may occur, for example, through reaction with oxygen in the ambient environment (preferably in the presence of a catalyst) or with an internally stored oxidant to form water vapor (which may be released to the environment or reused in the hydrogen generation reaction), by chemically fixing the hydrogen to a substrate to render it relatively non-reactive, or by passing the hydrogen to a shorted fuel cell membrane electrode assembly to be converted into water.

The fluid manifold 605 controls the flow of fluid to the chemical hydride 613, and also controls the rate of hydrogen generation. The fluid manifold 605 further accomplishes hydrogen/borate separation, and provides a means through which internal system pressure due to residual hydrogen generation may be relieved.

Figure 23:
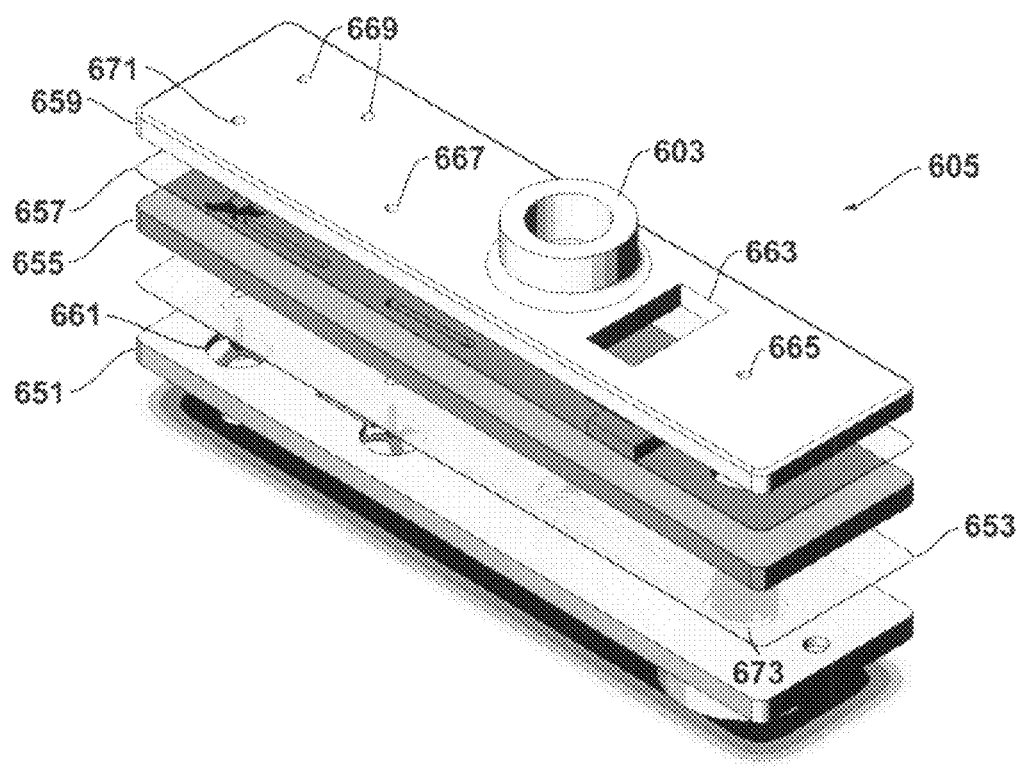
FIG. 23 is an exploded view of the fluid manifold of the hydrogen generator of FIG. 17.

The construction of the fluid manifold 605 may be appreciated with respect to FIGS. 23-31. As seen in FIG. 23, the fluid manifold 605 in this particular embodiment is a laminate comprising molded plastic components and thin layers of filtration media and elastomers. Thus, the fluid manifold 605 comprises a base plate 651, a separator layer 653, a mid plate 655, an elastomer layer 657, and a top plate 659. As explained in greater detail below, the base plate 651 is equipped with a plurality of valves (such as fluid forward pressure regulator valve 661) which control the flow of both fluid and hydrogen gas through the fluid manifold 605, and is further equipped with a reactor 673 where the generation of hydrogen gas occurs.

The top plate 659 is equipped with a hydrogen gas outlet 603, an active heater and water pump electrical access port 663, a static pressure port 665, a water shutoff actuator access port 667, water vapor vents 669, and a static pressure port 671. The top plate 659 may be constructed of thermally insulating material, such as suitable plastics or fiberglass, and provides interfaces with external devices that utilize a hydrogen gas such as, for example, fuel cells and gas chromatographs.

The elastomer layer 657 may comprise various suitable elastomeric materials. These include, without limitation, silicone and EPDM. The elastomer layer 657 provides a barrier between the ambient environment and reactants or byproducts disposed within the hydrogen generator 601, while allowing communication between the internal and external pressure. The elastomer layer 657 also serves as a seal between the top plate 659 and mid plate 655.

The midplate 655 preferably comprises high thermal conductivity, low thermal mass materials such as, for example, thermally conductive particles or fiber filled plastics, carbon or carbon composites, and metals. The midplate 655 provides fluid manifolding and thermal conduction to the reactants and/or byproducts.

The separator layer 653 preferably comprises a laminate which includes a filtration media capable of separating hydrogen from an alkaline solution (such filtration media may include, without limitation, expanded polytetrafluoroethylene (PTFE) or non-woven polyethylene fabric), adhesives, or elastomers. The separator layer 653 also serves as a sealing and/or adhesion layer between the midplate 655 and the base plate 651.

The base plate 651 preferably comprises a high thermal conductivity, low thermal mass material (such as those described above) or a composite consisting primarily of a thermally insulating material with an inclusion of thermally conductive material positioned between the catalytic reaction zone and the hydride/water interface zone. The base plate 651 provides fluid manifolding and thermal conduction to the reactants and/or byproducts. The base plate 651 also provides sites for liquid pressure regulator and shutoff valves, gas shutoff valves, and liquid pumps.

Though not specifically illustrated, it will be appreciated that the fluid manifold 605 may include various other layers and elements. For example, in some embodiments, the fluid manifold 605 may include appropriate circuitry to control the various valves and other devices that may be incorporated into the manifold. Such circuitry may be advantageously incorporated into the fluid manifold as one or more layers of flexibly circuitry, or may be disposed on one or more dies or printed circuit boards incorporated into the manifold. The manifold may also be wired for control by one or more external devices.

Figure 24:
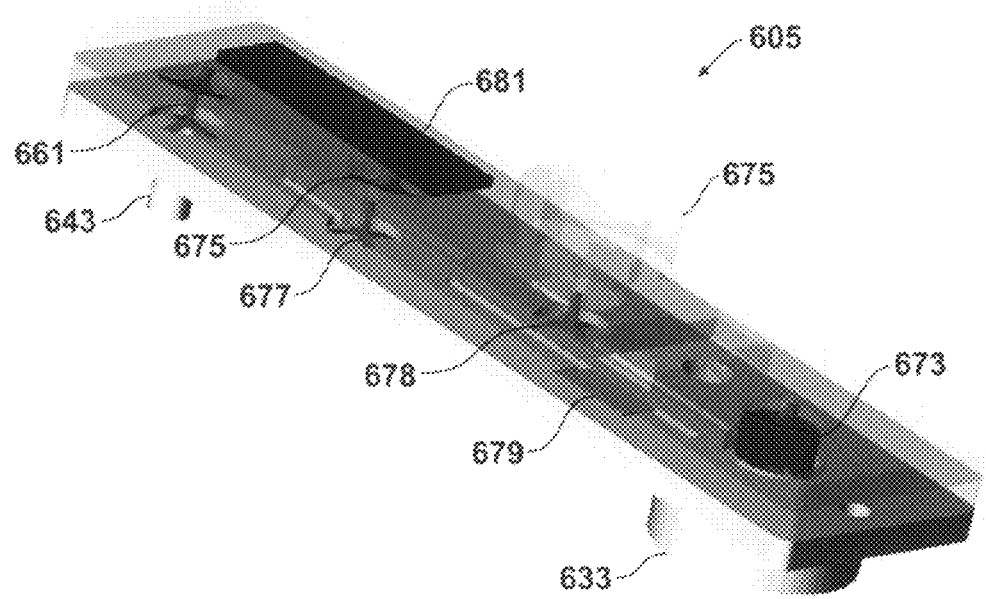
FIG. 24 is a view of the fluid manifold of the hydrogen generator of FIG. 17 with some of the layers thereof rendered transparent.
Figure 25:
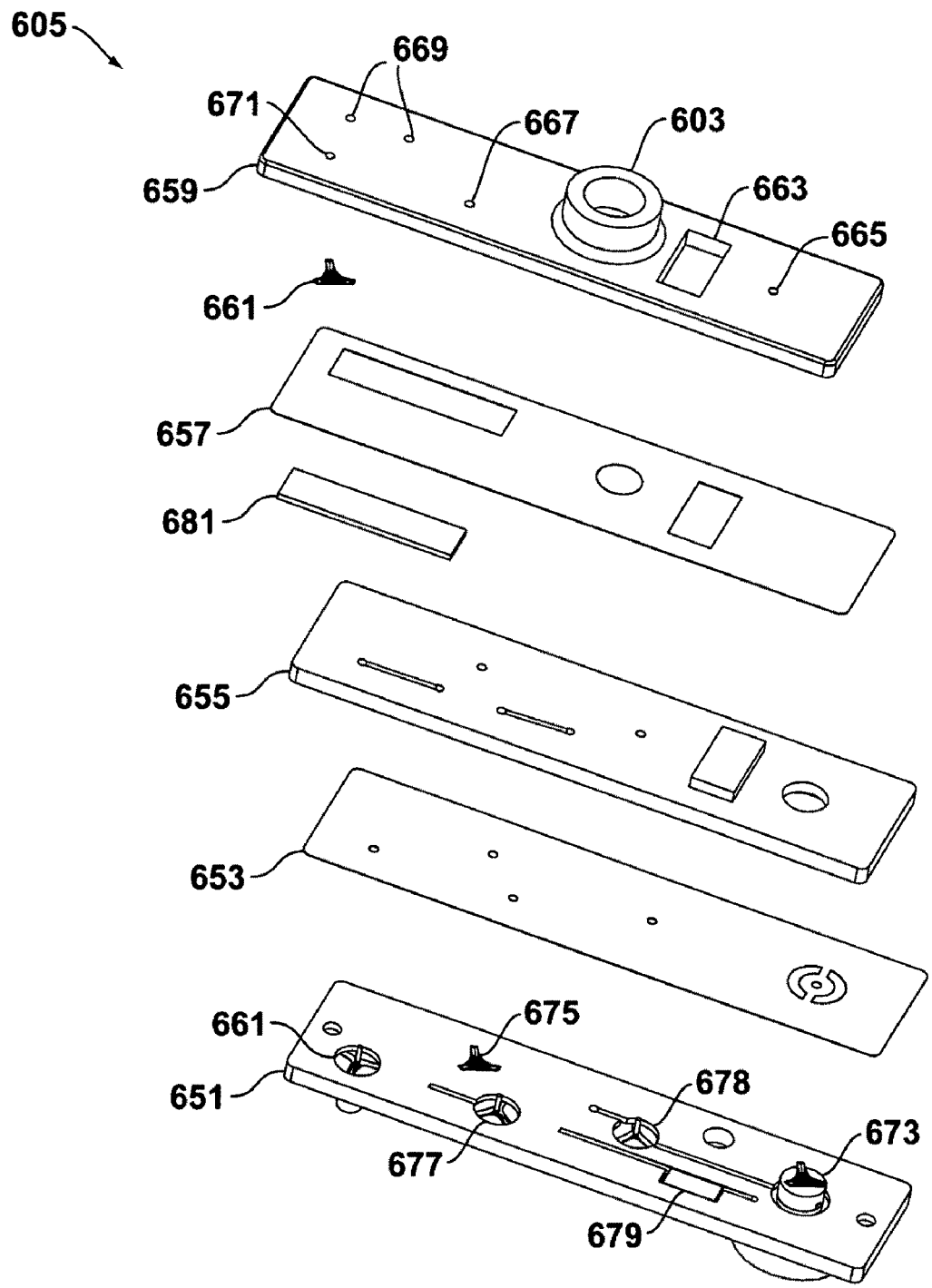
FIG. 25 is an exploded view of the fluid manifold of the hydrogen generator of FIG. 17.
Figure 26:
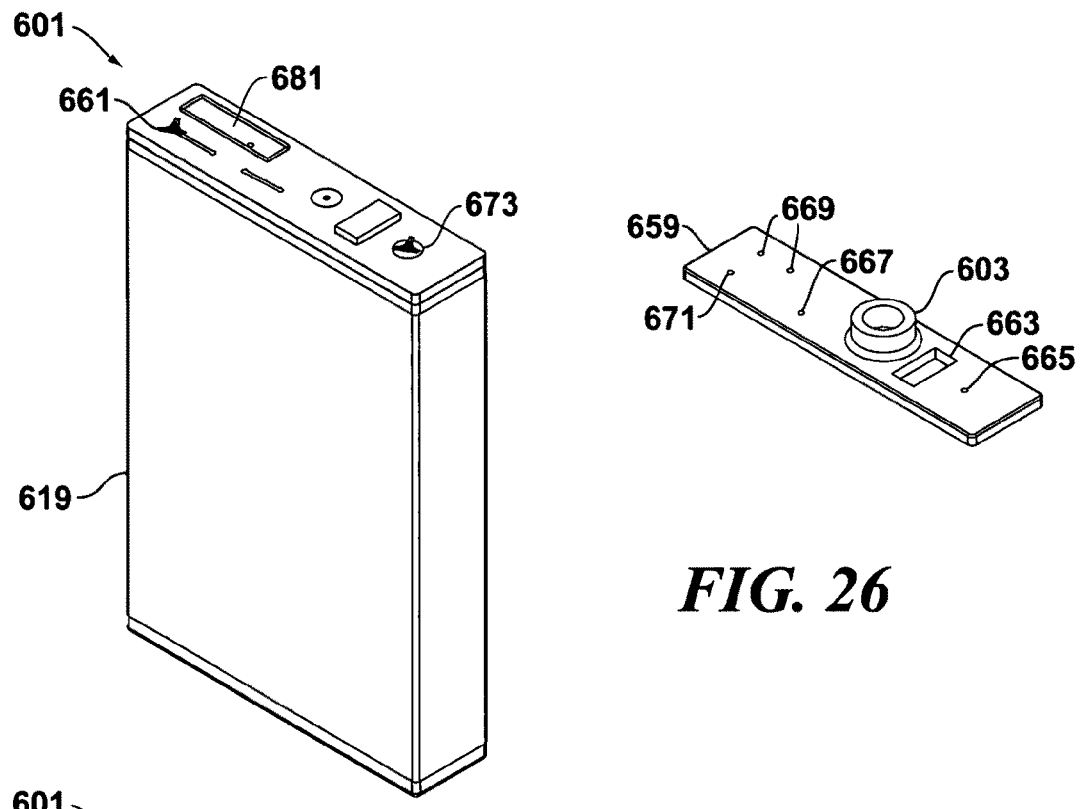
FIG. 26 is a partially exploded view of the hydrogen generator of FIG. 17.
Figure 27:
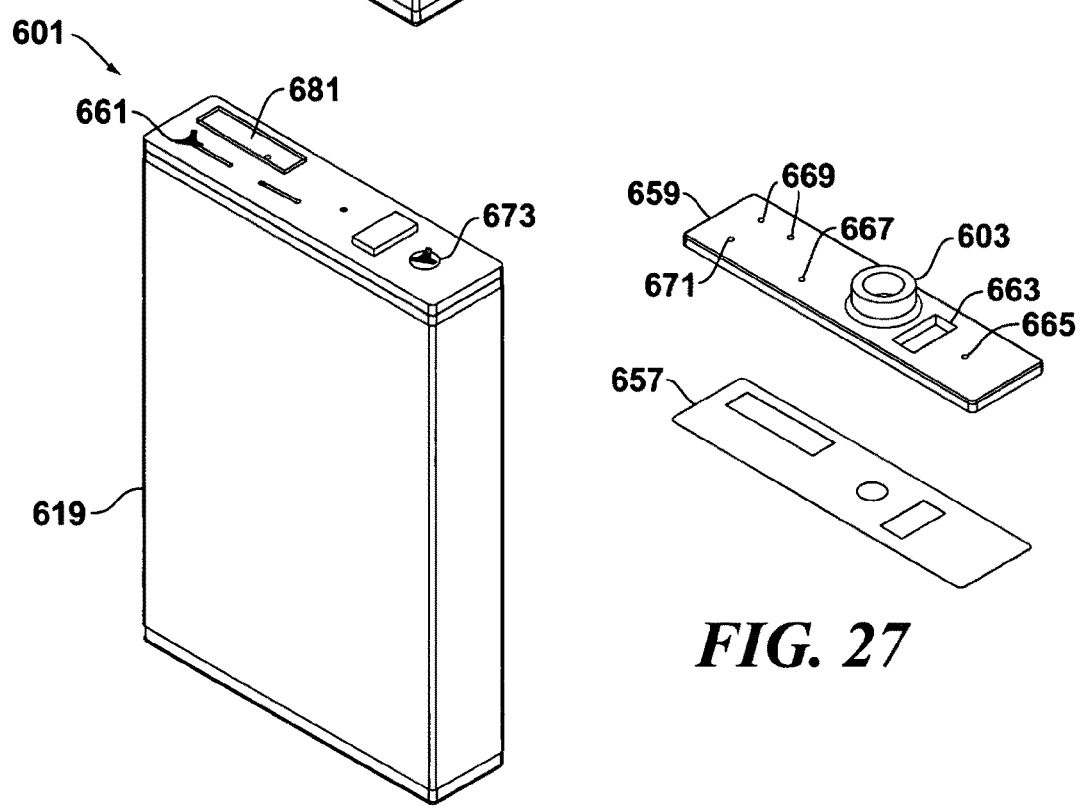
FIG. 27 is a partially exploded view of the hydrogen generator of FIG. 17.

With reference to FIG. 24, the fluid manifold 605 is further provided with a fluid forward pressure regulator valve 661, a 20 PSI check valve 675, an externally actuated fluid shut-off valve 677, a fluid pump 679 (described in greater detail below), and a hydrogen recombiner 681. FIGS. 25-29 further illustrate the construction and individual features of each of the laminate layers, as well as their assembly into the completed fluid manifold 605.

FIG. 30 illustrates the flow path of the fluid (which may be water or any of the various aqueous solutions described herein) employed in the hydrogen generator of FIG. 16 as it travels through the fluid manifold 605. As seen therein, fluid enters the fluid manifold 605 from the fluid bladder (not shown) by way of port 643. While fluid forward pressure regulator valve 661 is in an open position, the fluid passes through the fluid manifold 605 to the fluid shut-off valve 677. While the fluid shut-off valve 677 is in an open position, the fluid passes onto the water/hydride interface 683. There, the fluid dissolves a portion of chemical hydride (not shown), and the resulting solution or slurry passes into the catalytic reactor 673. In the catalytic reactor, the solution or slurry reacts in the presence of a suitable catalyst to generate hydrogen gas. The liquid byproducts from the hydrogen generation reaction flow out of the catalytic reactor 673 and exit the fluid manifold 605 by way of an aperture 685 (see also FIG. 21) and into the rectangular compartment 625 (see FIG. 19) of the chassis 619.

FIG. 31 illustrates the fluid flow path of hydrogen gas in the hydrogen generator of FIG. 17 as it travels through the fluid manifold 605. As seen therein, primary and secondary flow paths are created for hydrogen gas in the fluid manifold 605. The primary flow path extends from the catalytic reactor 673 to the hydrogen outlet 603, and is the path taken when the hydrogen generator is actively evolving hydrogen gas.

A first portion of the secondary flow path for hydrogen gas extends from the primary flow path to outlet 687, which is in open communication with the residual hydrogen vent 611 (see FIG. 18). This portion of the secondary flow path provides a means for releasing hydrogen gas (and thus reducing hydrogen gas pressure in the fluid manifold 605) which may accumulate in the rectangular compartment 625 of the chassis (see FIG. 19) or in the primary flow path upstream from the catalytic reactor 673 when the reactor is shut down. It will be appreciated that, in some embodiments, the residual hydrogen vent 611 may be designed to permit hydrogen gas to reenter the primary flow path by way of outlet 687 and the secondary flow path when demand for hydrogen resumes.

A second portion of the secondary flow path extends from the residual hydrogen vent 611 and is controlled by check valve 675. This portion of the secondary flow path provides a means for relieving pressure due to accumulating hydrogen gas in the rectangular compartment of the chassis 619 (see FIG. 19). The check valve 675 may be adapted to vent hydrogen gas at a predetermined pressure threshold such as, for example, 20 psi. In some embodiments, the hydrogen gas may be vented to the atmosphere, while in other embodiments, the hydrogen gas may be reacted with a catalyst and converted into water, or may be rendered less reactive through chemical bonding to a substrate. The later two types of embodiment are preferred in applications where the vented hydrogen gas might pose a risk of fire or explosion.

Figure 32:
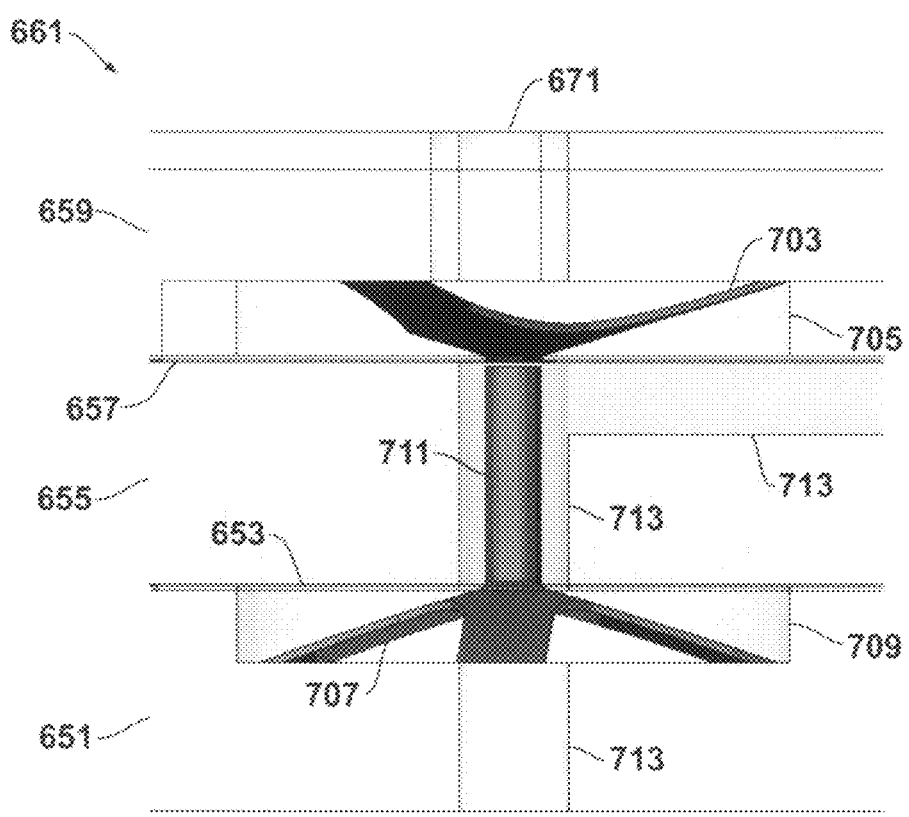
FIG. 32 is an illustration of a pressure regulator valve in the hydrogen generator of FIG. 17.

FIG. 32 illustrates the pressure regulator valve 661 in greater detail. As seen therein, the fluid pressure regulator valve 661 comprises a spring 703 disposed in a first compartment 705, a spring loaded valve stem 707 disposed in a second compartment 709, and a valve body 711 which physically connects the spring 703 to the spring loaded valve stem 707. The valve body 711 is disposed within the fluid flow path 713 (see FIG. 30). When the fluid pressure regulator valve 661 is in the open position, fluid flows around the valve stem 707 and along the flow path 713. When the fluid pressure regulator valve 661 is in the closed position, the valve stem 707, which preferably comprises a resilient material such as, for example, a fluoroelastomer, is compressed against the opening between the second compartment 709 and the fluid flow path 713, thereby sealing off the fluid flow path and arresting the flow of fluid therethrough. Static pressure port 671 allows for control of the fluid pressure regulator valve 661 through the pressure differential between the interior of the fluid bladder 607 (see FIG. 20) and the ambient environment.

Figure 33:
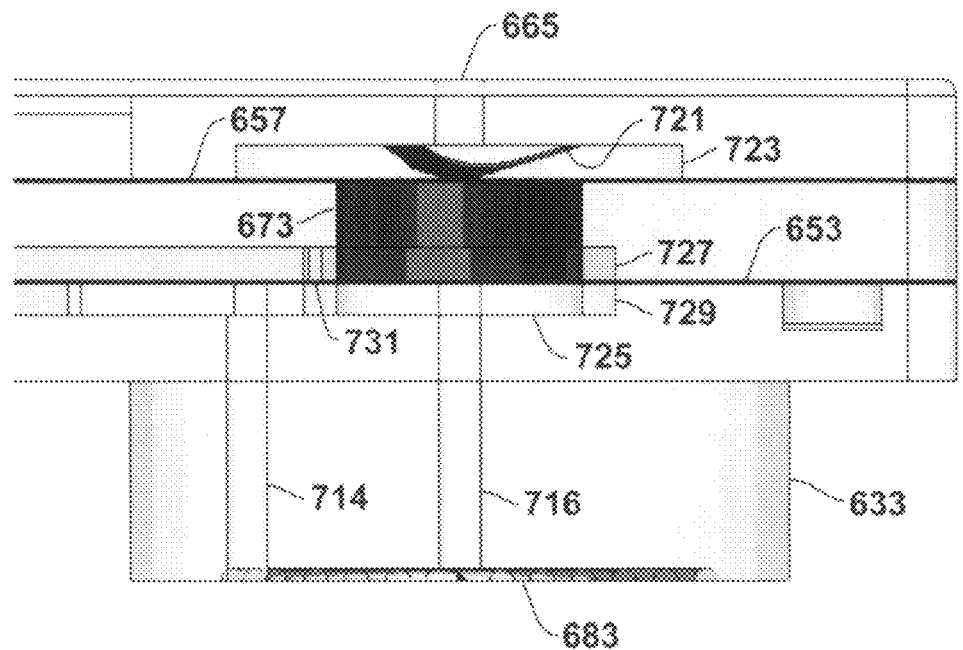
FIG. 33 is an illustration of the catalytic reactor in the hydrogen generator of FIG. 17.
Figure 34:
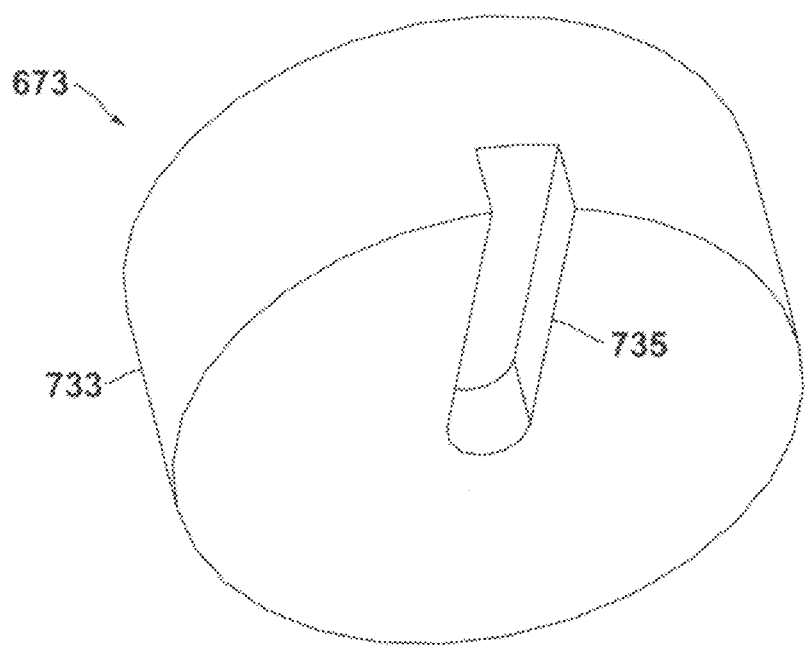
FIG. 34 is an illustration of the catalytic reactor in the hydrogen generator of FIG. 17.

FIGS. 33-34 illustrate the catalytic reactor 673 in greater detail. As seen therein, the catalytic reactor 673 in this particular embodiment is situated downstream from the fluid/hydride interface 683 (shown in greater detail in FIG. 44) such that fluid in the fluid flow path (see FIG. 30) flows into the fluid/hydride interface 683 by way of fluid flow channel 714, dissolves a portion of chemical hydride at the fluid/hydride interface 683, and flows from the fluid/hydride interface 683 to the catalytic reactor 673 via fluid flow channel 716.

Figure 40:
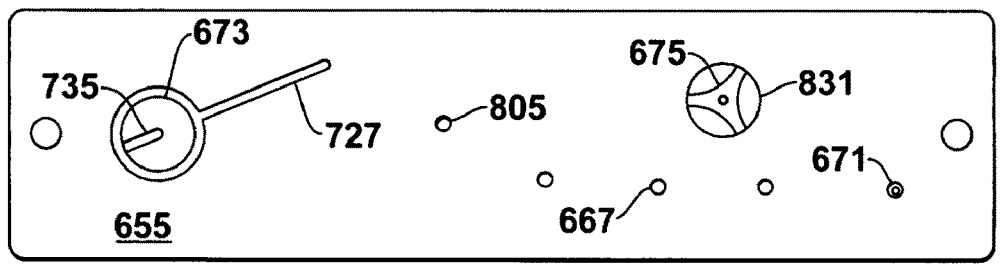
FIG. 40 is an illustration of a step in the manufacture of the hydrogen generator of FIG. 17.

As seen in FIG. 34, the catalytic reactor 673 in this particular embodiment comprises a cylindrical body 733 with a radial notch 735 defined therein. When the catalytic reactor 673 is in active mode (that is, when hydrogen gas is being actively generated), the catalytic reactor 673 is positioned such that the radial notch 735 places fluid flow channel 716 into fluidic communication with separator channel 727. Consequently, hydride solution flows through the radial notch 735 by way of fluid flow channel 716 and reacts in separator channel 727 (separator channel 727 is annular, as seen in FIG. 40) with a catalyst disposed on the exterior of the cylindrical body 733 of the catalytic reactor 673. The hydrogen gas exits the separator channel 727 by way of a separator vent 731. The flow of hydrogen gas in this process is depicted in FIG. 31.

When the catalytic reactor 673 is in passive mode (that is, when the active generation of hydrogen gas has been terminated), the catalytic reactor 673 is positioned (as by moving upward into compartment 723) such that the catalytic surface disposed on the exterior of cylindrical body 733 is no longer exposed to the hydride solution, thereby terminating the hydrogen generation reaction. Static pressure port 665 ensures that the catalytic reactor 673 will assume this position anytime the pressure differential between fluid flow channel 716 and the ambient environment exceeds a predetermined threshold value. Static pressure port 665, in combination with spring 721 (and possibly elastomeric layer 657), further ensures that the catalytic reactor 673 will resume the position depicted in FIG. 33 when the pressure differential drops below the threshold value. This threshold value may be determined, at least in part, by the spring constant of spring 721 and/or the resiliency of elastomeric layer 657. Hence, this feature allows the hydrogen generator to shut off automatically when hydrogen production exceeds demand, and to automatically resume hydrogen production when demand increases.

Figure 35:
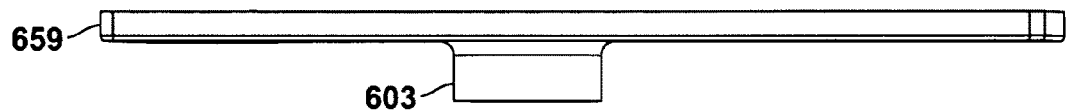
FIG. 35 is an illustration of a step in the manufacture of the hydrogen generator of FIG. 17.

FIGS. 35-44 illustrate one particular, non-limiting embodiment of a fabrication process that may be used to manufacture a hydrogen generator of the type depicted in FIG. 17. The steps in this process may be best understood in the context of FIGS. 23-29, which show various views of the completed assembly, it being noted that, while FIGS. 23-29 show the assembly from a top perspective, FIGS. 34-35 illustrate the fabrication of the assembly from bottom and side perspectives.

Figure 36:
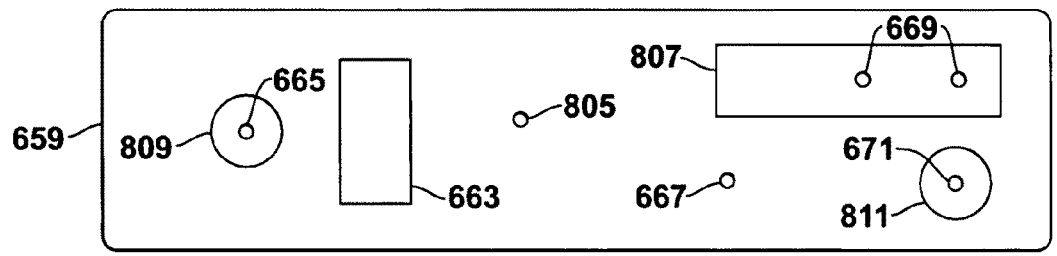
FIG. 36 is an illustration of a step in the manufacture of the hydrogen generator of FIG. 17.

As shown in FIGS. 35-36 (which are, respectively, side and bottom views of the top plate 659), the process begins with the formation of top plate 659, which is preferably constructed from a suitable polymeric material and which may be fabricated by injection molding or through various other suitable molding processes. The top plate 659 contains a hydrogen gas outlet 603 which is in fluidic communication with an aperture 805 provided at the bottom of the top plate 659. A rectangular indentation 807 and first 809 and second 811 cylindrical indentations are provided in the bottom of the top plate 659. The rectangular indentation 807 is in open communication with water vapor vents 669, and the first 809 and second 811 cylindrical indentations are in open communication with static pressure ports 665 and 671, respectively (see FIG. 23). The top plate 659 is also provided with a water pump electrical access port 663 and water shutoff actuator access 667.

Figure 37:
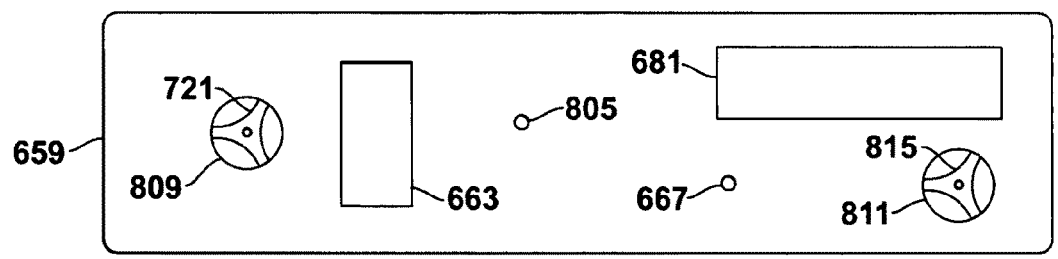
FIG. 37 is an illustration of a step in the manufacture of the hydrogen generator of FIG. 17.

Referring now to FIG. 37, hydrogen recombiner 681, which is typically a sheet of porous material, is placed into rectangular indentation 807, and springs 721 and 815 are placed into first 809 and second 811 cylindrical indentations, respectively. As seen in FIG. 33, spring 721 forms part of the catalytic reactor assembly and, as seen in FIG. 24, spring 815 forms part of fluid forward pressure regulator valve 661.

Figure 38:
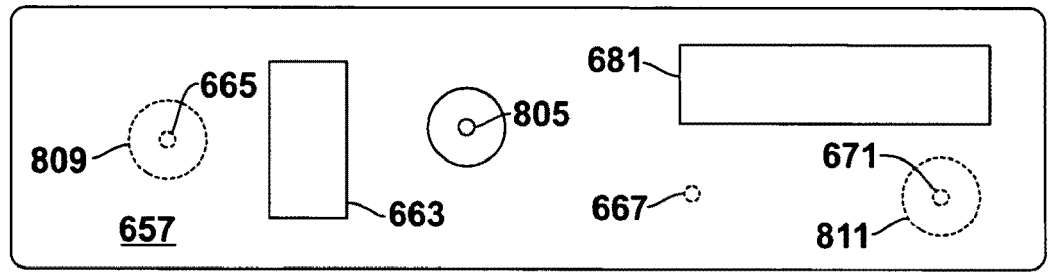
FIG. 38 is an illustration of a step in the manufacture of the hydrogen generator of FIG. 17.

Referring now to FIG. 38, elastomeric layer 657 is applied to the bottom surface of the top plate 659. The elastomeric layer 657, which may be attached to the substrate through welding or with suitable adhesives (such as, for example, pressure sensitive adhesives), is provided with suitable openings such that the hydrogen recombiner 681 and water pump electrical access port 663 are exposed.

Figure 39:
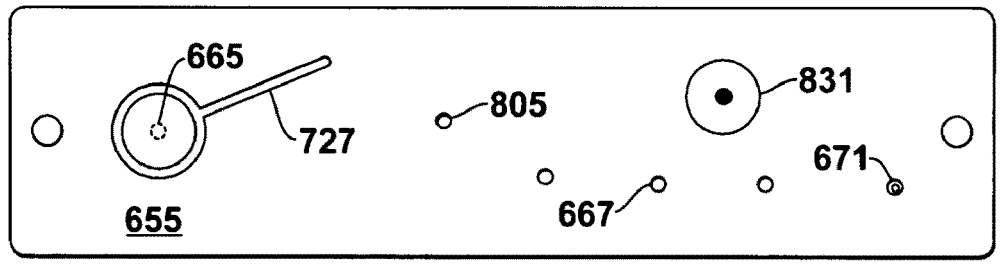
FIG. 39 is an illustration of a step in the manufacture of the hydrogen generator of FIG. 17.

With reference to FIG. 39, the midplate 655 is then positioned over the elastomeric layer 657. The midplate 655 has formed in a surface thereof a channel 727, a static pressure port 671 and a cylindrical depression 831. The channel 727 forms a portion of the liquid flow path (see FIG. 30) by which the reaction byproducts are removed from the catalytic reactor 673 to the rectangular compartment 625 (see FIG. 19) of the chassis 619.

Referring now to FIG. 40, the catalytic reactor 673 is positioned such that it is disposed over spring 721 (see FIG. 37). Also, check valve 675 is disposed in cylindrical depression 831.

Figure 41:
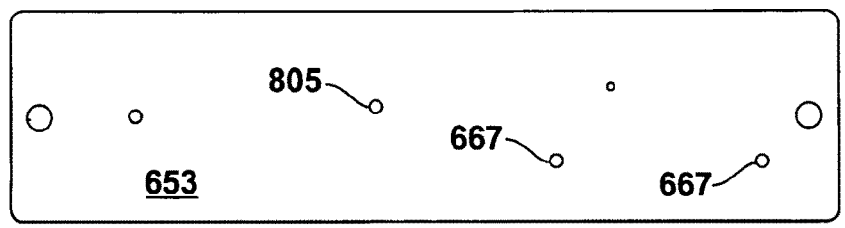
FIG. 41 is an illustration of a step in the manufacture of the hydrogen generator of FIG. 17.

With reference to FIG. 41, the filtration layer 653 is disposed over the midplate 655. Preferably, the filtration layer 653 comprises thermo-mechanically expanded polytetrafluoroethylene (PTFE) or other suitable fluoropolymer materials. In some embodiments, the filtration layer 653 may also serve as a bonding layer for the assembly, in which case, if it is not suitably tacky by itself, it may be coated with a suitable adhesive on one or both sides as appropriate.

Figure 42:
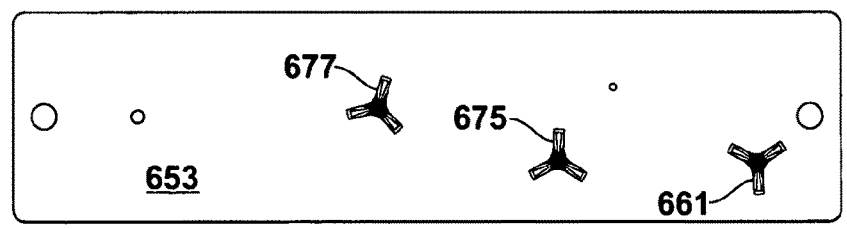
FIG. 42 is an illustration of a step in the manufacture of the hydrogen generator of FIG. 17.
Figure 43:
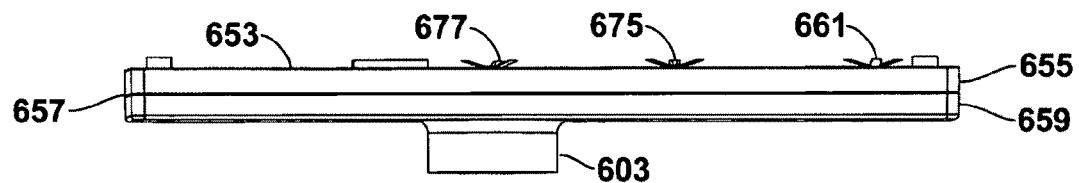
FIG. 43 is an illustration of a step in the manufacture of the hydrogen generator of FIG. 17.
Figure 44:
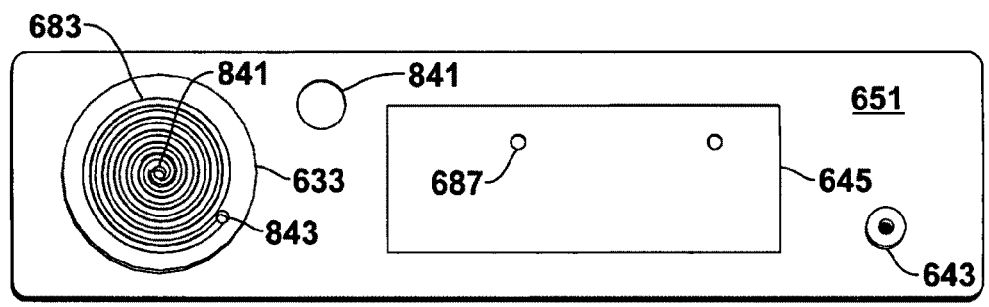
FIG. 44 is an illustration of a step in the manufacture of the hydrogen generator of FIG. 17.
Figure 45:
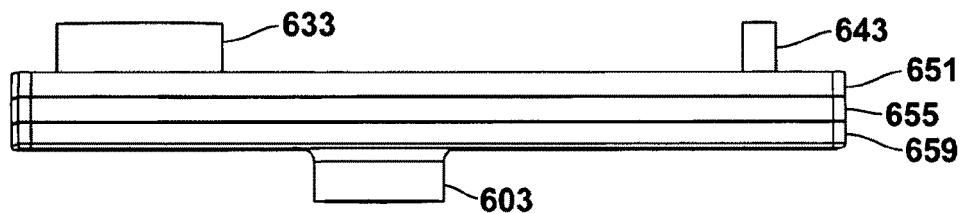
FIG. 45 is an illustration of a step in the manufacture of the hydrogen generator of FIG. 17.

Referring now to FIG. 42, after the filtration layer 653 is in place, valves 661, 675 and 677 (all of which, in this particular embodiment, are spring actuated stem valves) are positioned on the filtration layer 653 over holes 805, 667 and 671, respectively. FIG. 43 shows a side view of the assembly at this stage of the process. The use of spring actuated stem valves in this process is advantageous in that they are self-centering. Referring now to FIG. 44 and FIG. 45 (the later of which is a side view of FIG. 44), the bottom plate 651 is then placed over the filtration layer 653, thereby completing the assembly of fluid manifold 605. The components of the bottom plate 651, such as the hydride/water interface 633 and port 643, may be integrally molded with the bottom plate 651 or may be mounted on the bottom plate 651 after the remainder of the fluid manifold 605 has been assembled.

Referring again to FIG. 44, it can be seen that, in this particular embodiment, the hydride/water interface 633 has a grooved, helical surface 683. The grooves of the helical surface 683, in combination with inlet 841 and outlet 843 defined therein, form a portion of the fluid flow path depicted in FIG. 30 when the helical surface 683 is pressed against an opposing hydride surface. This portion of the fluid flow path is convoluted, thereby increasing the duration of contact between the fluid and the hydride and helping to saturate the resulting solution. Saturation of this solution is beneficial from an energy per unit weight perspective in that it helps to maximize the amount of hydrogen generated per unit weight of water. Of course, it will be appreciated that other hydride/water interfaces of the various types taught herein may be substituted for the hydride/water interface 633 depicted in FIG. 44, including, for example, porous glass fiber materials.

The hydrogen generator 601 depicted in FIG. 17 has some key advantages that make it particularly suitable for certain applications. For example, embodiments of this device can be made which utilize an active heating element that immediately heats the catalytic reactor and hydride/water interface zones, thus increasing hydride solubility and catalytic reactivity and increasing start-up times (in many such embodiments, startup times of less than 10 seconds may be achieved). The use of a self-regulated heater, such as a PTC thermistor, is often advantageous in such embodiments because it is able to reduce power consumption to essentially zero once a specified temperature is obtained (often within the start-up time), since the catalytic reaction is exothermic and provides the temperature sustaining heat during operation.

Similarly, in some embodiments, the hydrogen generator 601 depicted in FIG. 17 offers rapid shutdown (in many embodiments, shutdown times of less than 10 seconds may be achieved), due to the presence of the fluid forward pressure regulator valve 661 which is preferably referenced to the ambient atmosphere with a small positive bias (typically between 2 and 5 psia), and which rapidly shuts off fluid flow from the fluid bladder 607 (see FIG. 18) to the hydride/water interface 633 (see FIG. 21). Rapid and complete shutdown is also assisted by the use of a catalytic surface that has a pressure actuated capability to separate the catalytic region from the hydride solution, immediately stopping catalytically assisted hydrolysis of the hydride solution.

Moreover, in some embodiments of hydrogen generator 601, slow hydrolysis of residual hydride solution and the resulting increase in hydrogen pressure within hydrogen generator 601 may be reduced with the hydrogen recombiner 681 (see FIG. 37). Hence, the hydrogen generator 681 allows for the elimination of such excess hydrogen gas, while venting only water vapor to the ambient environment. Similarly, fluid movement to the hydride/water interface 633 (see FIG. 21) may be restricted by an externally actuated fluid shutoff valve, and hydrogen gas venting may be restricted by an externally actuated gas shutoff valve, to eliminate the possibility of generating or venting hydrogen gas when hydrogen is not needed.

The hydrogen generator 601 depicted in FIG. 17 is illustrated as a stand-alone device. However, it will be appreciated that this device may be readily integrated with one or more fuel cells or other such devices. Thus, for example, the fluid manifold may be modified to include additional layers containing the necessary functionalities of a fuel cell, or else such functionalities may be incorporated into one or more of the layers described herein. Such constructions would be especially advantageous for disposable fuel cells, such as alkaline fuel cells. In such an application, any product water formed on the hydrogen side of the fuel cell could be returned to the hydride/water interface, thereby reducing the amount of water required to be stored by the device and/or increasing the amount of hydride the device can contain. In the case of an alkaline fuel cell, the fluid manifold may include a filtration laminate on top of the cathode to filter $CO_2$ and other contaminants that may be detrimental to the hydrogen generator or its components.

Moreover, the principles described herein may be applied to the packaging of hydrogen generators. For example, a hydrogen recombiner of the type described herein for eliminating residual hydrogen gas may be utilized to eliminate residual hydrogen gas that may accumulate in the packaging of hydrogen generators, especially if the hydrogen generators stored for a significant period of time. As a specific, non-limiting example, multiple hydrogen generators may be stored in a plastic bag, and the plastic bag may itself be equipped with a hydrogen recombiner. As a further specific, non-limiting example, a hydrogen recombiner may also be incorporated into blister packaging used for individual hydrogen generators or devices that incorporate them.

A. Heating Elements

In the various catalytic reactors disclosed herein, it is preferred to heat the liquid reactant in the presence of the catalyst since, at least when sodium borohydride is used as the hydrogen-containing material, the hydrogen generation reaction is typically catalyzed with greater efficiency at higher temperature levels. Moreover, the distribution of byproducts at higher temperatures (e.g., around 90° C.) will typically be centered around lower hydration states than is the case when the hydrogen generation reaction occurs at lower temperatures. It will be appreciated that, in various embodiments, suitable heating may be implemented by heating the liquid, the catalyst, or both. In some embodiments, heating may also be utilized as a solubility enhancer for the hydrogen-containing material.

In the case of hydrogen generators that are to be used in conjunction with fuel cells in laptop computers or handheld electronic devices, the dimensions of the catalytic reactor will frequently be sufficiently small such that flash heating of the liquid reactant can be economically performed in the presence of the catalyst, using techniques similar to those developed for thermal inkjet printers. Such flash heating can be utilized to generate discrete bubbles of hydrogen gas that span the diameter of the fluid flow through the reactor, and that can be readily adsorbed from the fluid flow in the reactor through a hydrogen-permeable membrane. Hence, flash heating can serve the simultaneous purposes of improving the efficiency of the hydrogen generation reaction, reducing the amount of water consumed by reaction byproducts, and facilitating the separation of hydrogen gas from reaction byproducts and unreacted materials. Moreover, the generation of bubbles via flash heating may be used in the devices and methodologies described herein, either alone or in combination with other such mechanisms as piezoelectric actuators, to push (or pull) liquid reactants or other materials through the reaction zone and through other parts of the device.

In one such embodiment, the catalytic reactor may be fabricated with a series of tiny electrically-heated chambers that may be constructed, for example, by photolithography. In use, the reactor runs a pulse of current through the heating elements, which rapidly heats the liquid reactant in the vicinity of the catalyst. This results in the formation of a bubble of hydrogen which, as it is adsorbed through the adjacent hydrogen-permeable membrane, sucks a further portion of liquid reactant into the catalytic reactor. Hence, the flash heater acts as an effective pumping mechanism while hydrogen is being generated, and further provides a convenient means by which the rate of hydrogen evolution may be scaled up or down in accordance with demand.

It will be appreciated that the flash heating methods described above may be implemented in a variety of ways. For example, a positive temperature coefficient thermistor may be provided which is integrated with, or which controls, the heating devices. Such a thermistor may be designed with an electrical resistance that is low at room temperature, but becomes very high at some desired strike temperature. Hence, the thermistor will efficiently heat the liquid reactants up to the strike temperature, and will then effectively shut off.

In some embodiments, the electronic circuitry controlling the catalytic reactor may be incorporated into the hydrogen generator. In other embodiments, some, or the bulk of, this circuitry may be integrated into a hydrogen fuel cell that is coupled to the hydrogen generator, or into the host device. This later type of embodiment may be particularly advantageous in applications where it is desired to fashion the hydrogen generator as a disposable device. The electronic circuitry may also comprise various piezoelectric pumps which may be used to control the flow of reactants through the hydrogen generator.

The electronic circuitry may further include sensors which are adapted, for example, to sense changes in the volume of components of the hydrogen generator due, for example, to the accumulation of hydrogen gas. It will be appreciated that such circuitry may be utilized to monitor the status of the hydrogen generator, and/or to control the hydrogen evolution reaction in accordance with the existing demand for hydrogen.

B. Housing Materials

Various materials may be used in the housings of the hydrogen generators described herein. Preferably, the housing comprises aluminum, due to the unique combination of strength, light weight, and relative chemical inertness. However, it will be appreciated that the housing could also be constructed from various other materials, including various metals (such as magnesium, tin, titanium, and their alloys) and various metal alloys, including steel. The housing may also comprise various polymeric materials, including polyethylene, polypropylene, PVC, nylon, graphite, and various glasses. If the housing comprises a metal such as aluminum, the interior of the housing is preferably coated with a protective layer of a suitable material, such as an epoxy resin, which is inert to the reactants and the products and byproducts of the hydrolysis reaction. The housing, or portions thereof, may also be thermally insulated.

C. Hydrides, Borohydrides and Boranes

Various hydrides, or combinations of hydrides, that produce hydrogen upon contacting water at temperatures that are desired within the hydrogen generator may be used in the devices and methodologies described herein. Salt-like and covalent hydrides of light metals, especially those metals found in Groups I and II, and even some metals found in Group III, of the Periodic Table are useful and include, for example, hydrides of lithium, sodium, potassium, rubidium, cesium, magnesium, beryllium, calcium, aluminum or combinations thereof. Preferred hydrides include, for example, borohydrides, alanates, or combinations thereof.

As shown in TABLE 1 and TABLE 2 below, the hydrides of many of the light metals appearing in the first, second and third groups of the periodic table contain a significant amount of hydrogen on a weight percent basis and release their hydrogen by a hydrolysis reaction upon the addition of water. The hydrolysis reactions that proceed to an oxide and hydrogen (see TABLE 2) provide the highest hydrogen yield, but may not be useful for generating hydrogen in a lightweight hydrogen generator that operates at ambient conditions because these reactions tend to proceed only at high temperatures. Therefore, the most useful reactions for a lightweight hydrogen generator that operates at ambient conditions are those reactions that proceed to hydrogen and a hydroxide. Both the salt-like hydrides and the covalent hydrides are useful compounds for hydrogen production because both proceed to yield the hydroxide and hydrogen.

TABLE 1

Hydrogen Content of Metal Hydrides

| | | Wt % $H_2$ | |
|---|---|---|---|
| Compound | Neat | With Stoichiometric $H_2O$ | Double Stoichiometric $H_2O$ |
| Salt-like Hydrides | | | |
| LiH | 12.68 | 11.89 | 7.76 |
| NaH | 4.20 | 6.11 | 4.80 |
| KH | 2.51 | 4.10 | 3.47 |
| RbH | 1.17 | 2.11 | 1.93 |
| CsH | 0.75 | 1.41 | 1.33 |
| $MgH_2$ | 7.66 | 9.09 | 6.47 |
| $CaH_2$ | 4.79 | 6.71 | 5.16 |
| Covalent Hydrides | | | |
| $LiBH_4$ | 18.51 | 13.95 | 8.59 |
| $NaBH_4$ | 10.66 | 10.92 | 7.34 |
| $KBH_4$ | 7.47 | 8.96 | 6.40 |

TABLE 1-continued

Hydrogen Content of Metal Hydrides

| | | Wt % $H_2$ | |
|---|---|---|---|
| Compound | Neat | With Stoichiometric $H_2O$ | Double Stoichiometric $H_2O$ |
| $Mg(BH_4)_2$ | 11.94 | 12.79 | 8.14 |
| $Ca(BH_4)_2$ | 11.56 | 11.37 | 7.54 |
| $LiAlH_4$ | 10.62 | 10.90 | 7.33 |
| $NaAlH_4$ | 7.47 | 8.96 | 6.40 |
| $KAlH_4$ | 5.75 | 7.60 | 5.67 |
| $Li_3AlH_6$ | 11.23 | 11.21 | 7.47 |
| $Na_3AlH_6$ | 5.93 | 7.75 | 5.76 |

TABLE 2

Hydrogen Yield from the Hydrolysis of Metal Hydrides

| Reaction | Equation No. | Hydrogen Yield (wt %) Stoichiometric Water | Double Water |
|---|---|---|---|
| Reaction to Oxide | | | |
| $LiBH_4 + 2 H_2O \rightarrow LiBO_2 + 4 H_2$ | 1 | 13.95 | 8.59 |
| $2 LiH + H_2O \rightarrow Li_2O + 2 H_2$ | 2 | 11.89 | 7.76 |
| $NaBH_4 + 2 H_2O \rightarrow NaBO_2 + 4 H_2$ | 3 | 10.92 | 7.34 |
| $LiAlH_4 + 2 H_2O \rightarrow LiAlO_2 + 4 H_2$ | 4 | 10.90 | 7.33 |
| Reaction to Hydroxide | | | |
| $LiBH_4 + 4 H_2O \rightarrow LiB(OH)_4 + 4 H_2$ | 5 | 8.59 | 4.86 |
| $LiH + H_2O \rightarrow LiOH + H_2$ | 6 | 7.76 | 4.58 |
| $NaBH_4 + 4 H_2O \rightarrow NaB(OH)_4 + 4 H_2$ | 7 | 7.34 | 4.43 |
| $LiAlH_4 + 4 H_2O \rightarrow LiAl(OH)_4 + 4 H_2$ | 8 | 7.33 | 4.43 |
| Reaction to Hydrate Complex | | | |
| $LiH + 2 H_2O \rightarrow LiOH \cdot H_2O + H_2$ | 9 | 4.58 | 2.52 |
| $2 LiAlH_4 + 10 H_2O \rightarrow LiAl_2(OH)_7 \cdot H_2O + LiOH \cdot H_2O + 8 H_2$ | 10 | 6.30 | 3.70 |
| $NaBH_4 + 6 H_2O \rightarrow NaBO_2 \cdot 4 H_2O + 4 H_2$ | 11 | 5.49 | 3.15 |

The salt-like hydrides, such as LiH, NaH, and $MgH_2$, are generally not soluble in most common solvents under near ambient conditions. Many of these compounds are only stable as solids, and decompose when heated, rather than melting congruently. These compounds tend to react spontaneously with water to produce hydrogen, and continue to react as long as there is contact between the water and the salt-like hydride. In some cases the reaction products may form a blocking layer that slows or stops the reaction, but breaking up or dispersing the blocking layer or removing it from the reaction zone immediately returns the reaction to its initial rate as the water can again contact the unreacted hydride. Methods for controlling the hydrogen production from the salt-like compounds generally include controlling the rate of water addition.

The covalent hydrides shown in TABLE 1 are comprised of a covalently bonded hydride anion, e.g., $BH_4^-$, $AlH_4^-$, and a simple cation, e.g., $Na^+$, $Li^+$. These compounds are frequently soluble in high dielectric solvents, although some decomposition may occur. For example, $NaBH_4$ promptly reacts with water at neutral or acidic pH but is kinetically quite slow at alkaline pH. When $NaBH_4$ is added to neutral pH water, the reaction proceeds but, because the product is alkaline, the reaction slows to a near stop as the pH of the water rises and a metastable solution is formed. In fact, a basic solution of $NaBH_4$ is stable for months at temperatures below 5° C.

Some of the covalent hydrides, such as LiAlH$_4$, react very similarly to the salt-like hydrides and react with water in a hydrolysis reaction as long as water remains in contact with the hydrides. Others covalent hydrides react similarly to NaBH$_4$ and KBH$_4$ and only react with water to a limited extent, forming metastable solutions. However, in the presence of catalysts, these metastable solutions continue to react and generate hydrogen.

Using a catalyst to drive the hydrolysis reaction of the covalent hydrides to completion is advantageous because the weight percent of hydrogen available in the covalent hydrides is generally higher than that available in the salt-like hydrides, as shown in TABLE 1. Therefore, the covalent hydrides are preferred as a hydrogen source in some embodiments of a hydrogen generator because of their higher hydrogen content as a weight percent of the total mass of the generator.

The devices and methodologies described herein may use solid chemical hydrides as the hydrogen-containing material which is combined with water in a manner that facilitates a hydrolysis reaction to generate hydrogen gas. Preferably, these chemical hydrides include alkali metal borohydrides, alkali metal hydrides, metal borohydrides, and metal hydrides, including, but not limited to, sodium borohydride NaBH$_4$ (sometimes designated NBH), sodium hydride (NaH), lithium borohydride (LiBH$_4$), lithium hydride (LiH), calcium hydride (CaH$_2$), calcium borohydride (Ca(BH$_4$)$_2$), magnesium borohydride (MgBH$_4$), potassium borohydride (KBH$_4$), and aluminum borohydride (Al(BH$_4$)$_3$).

Another class of materials that may be useful in the devices and methodologies described herein are chemical hydrides with empirical formula B$_x$N$_x$H$_y$, and various compounds of the general formula B$_x$N$_y$H$_z$. Specific examples of these materials include aminoboranes such as ammonia borane (H$_3$BNH$_3$), diborane diammoniate, H$_2$B(NH$_3$)$_2$BH$_4$, poly-(aminoborane), borazine (B$_3$N$_3$H$_6$), morpholine borane, borane-tetrahydrofuran complex, diborane, and the like. In some applications, hydrazine and its derivatives may also be useful, especially in applications where the toxicity of many hydrazine compounds is trumped by other considerations.

Various hydrogen gas-generating formulations may be prepared using these or other aminoboranes (or their derivatives). In some cases, the aminoboranes may be mixed and ball milled together with a reactive heat-generating compound, such as LiAlH$_4$, or with a mixture, such as NaBH$_4$ and Fe$_2$O$_3$. Upon ignition, the heat-generating compound in the mixture undergoes an exothermic reaction, and the energy released by this reaction pyrolyzes the aminoborane(s), thus forming boron nitride (BN) and H$_2$ gas. A heating wire, comprising nichrome or other suitable materials, may be used to initiate a self-sustaining reaction within these compositions.

In some embodiments of the devices and methodologies described herein, salt hydrates may be utilized as the water-generating material. The use of such materials can be advantageous in some applications due in part to the large amounts of thermal energy per unit weight that can be consumed by the dehydration reaction these materials. Materials other than hydrate salts may be used in place of, or in addition to, these materials in the various devices and methodologies disclosed herein. For example, materials that undergo condensation reactions (especially dehydration condensation reactions), either by themselves or by reacting with other materials, may be used. One example of such a material includes materials that undergo condensation polymerization reactions. Another example of such a material are materials that undergo dehydration reactions, either through intramolecular or intermolecular processes. For example, carboxylic acids and polycarboxylic acids that undergo dehydration reactions to form the corresponding ester, ether, or acetate, either through an intermolecular reaction or through an intramolecular reaction, may be utilized in some embodiments as the water-generating material. A further advantage of this type of material is that the dehydration product may contain no hydration states, or fewer hydration states, than the starting material, thus increasing the total amount of water liberated by the reaction.

A further class of materials that may be used in this capacity include sterically hindered hydrates that exhibit rotational isomerism. These materials are capable of undergoing rotation about the axis of a central bond (this will frequently be a boron carbon bond, a nitrogen-nitrogen bond, or a carbon-carbon bond, but may occur around other bonds as well) to transition between at least a first and second isomeric state. The material is provided in a first state in which it is an n-hydrate material at temperature $T_1$. However, upon exposure to heat, it undergoes a dehydration reaction, and also undergoes rotation about the bond to transition to a second isomeric state in which it is a k-hydrate material at $T_1$, wherein n>k. This may be, for example, because of a change in symmetry of the second state compared to the first state, or because of the presence of hydrogen bonding or other phenomenon which interfere with the ability of water molecules to bind to the material (hydrogen bonding and other such phenomenon may also be utilized advantageously to keep the material in the second isomeric state after rotation about the axis has occurred). As a result of this reaction, the hydrate loses water irreversibly or semi-irreversibly.

A similar phenomenon may be used with the hydrogen-generating material itself. That is, the hydrogen-generating material may be designed so that, when it undergoes the hydrogen evolution reaction, the heat evolved causes the resulting byproduct to assume (preferably irreversibly) a second rotational isomeric state in which it binds to a reduced amount of water, as compared to the rotational isomers of the byproduct. The heat adsorbed by the change in isomeric states may serve as a further aid in controlling the overall heat generated by the hydrogen generator. In some embodiments, rotational isomers may be used as a heat adsorbing means, even without respect to their possible hydration states.

In some embodiments of the devices, methodologies and compositions described herein, steric hindrance can be utilized as a mechanism to prevent the hydrogen-generating material from undergoing a hydration reaction, as, for example, by occluding binding sites for water molecules in the reaction byproduct. In these embodiments, various substituted hydrides, borohydrides, boranes, aminoboranes, hydrazines, and the like may be utilized as the sterically hindered reactant, with the choice of substituents depending in part on the stereochemistry of the system. These materials offer the potential advantage of consuming most, if not all, of the water present in the system in the hydrogen-generation reaction, whether that water is present as free water molecules or water of crystallization.

Still another class of materials useful as a source of stored moisture are polymer hydrates. These compounds include (but are not limited to) polycarboxylic acids, polyacrylamides, and other polymeric materials with functional groups capable of binding to water. Both classes of compounds can act to solidify, or gel, large quantities of water. Unlike inorganic hydrates, these materials lack both a crystalline structure (i.e., they are amorphous) and a sharp melting or dehydration temperature. Both give up their water over a broad temperature range. The use of compounds such as these in a reactor of the type described above can produce a gradual release of water. In some embodiments, the rate of release may increase with any increase in temperature.

Some of these compounds, notably polyacrylimides, have another useful feature, namely, that their affinity for water tends to vary inversely with the ionic strength of the solution they are in contact with. This means that a saturated polymer in contact with a dilute ionic solution will release water into the solution as its ion concentration increases. If a solid hydride is brought into contact with a polymer saturated with respect to pure water, the increase in ionic concentration in the solution brought about by the hydrolysis reaction will cause the polymer to release additional water.

D. Catalysts

As noted above, in some instances, a catalyst may be required to initiate the hydrolysis reaction of the chemical hydride with water. Useful catalysts for this purpose include one or more of the transition metals found in Groups IB-VIII of the Periodic Table. The catalyst may comprise one or more of the precious metals and/or may include cobalt, nickel, tungsten carbide or combinations thereof. Ruthenium, ruthenium chloride and combinations thereof are preferred catalysts.

Various organic pigments may also be useful in catalyzing the hydrolysis reaction. Some non-limiting examples of these materials include pyranthrenedione, indanthrene Gold Orange, ditridecyl-3,4,9,10-perylenetetracarboxylic diimide, indanthrene black, dimethoxy violanthrone, quinacridone, 1,4-di-keto-pyrrolo (3,4 C) pyrrole, indanthrene yellow, copper phthalocyanine, 3,4,9,10, perylenetetracarboxylic dianhydride, isoviolanthrone, perylenetetracarboxylic diimide, and perylene diimide. These materials, most of which are not metal based, may offer environmental or cost advantages in certain applications.

The catalysts used in the devices and methodologies disclosed herein may be present as powders, blacks, salts of the active metal, oxides, mixed oxides, organometallic compounds, or combinations of the foregoing. For those catalysts that are active metals, oxides, mixed oxides or combinations thereof, the hydrogen generator may further comprise a support for supporting the catalyst on a surface thereof.

The catalyst can be incorporated into the hydrolysis reaction in a variety of ways, including, but not limited to: (i) mixing the catalyst with the hydrogen-containing material first, and then adding water to the hydrogen-containing material/catalyst mixture; (ii) mixing the catalyst with the reactant water first, and then adding this solution/mixture to the hydrogen-containing material; or (iii) combining the hydrogen-containing material with water in the presence of a porous structure that is made of, or contains, a catalyst. The hydrogen generating devices described herein can be adapted to support one or more of these methods for incorporating catalyst into a reactor.

Catalyst concentrations in the hydrogen-generating compositions described herein may vary widely. For some applications, the set catalyst concentration may range between about 0.1 wt % to about 20 wt % active metals based on the total amount of hydride and on the active element or elements in the catalyst. Preferably, the set catalyst concentration may range from between about 0.1 wt % to about 15 wt %, and more preferably, between about 0.3 wt % to about 7 wt %.

E. Reaction Interface

Various materials may be used in the reaction interface in the hydrogen generators described herein. Preferably, the reaction interface is sufficiently porous to permit the egress of spent hydrogen-containing material (e.g., sodium borate and its hydrates) through the interface, but has sufficient strength to withstand the pressure exerted on it by the compression mechanism within the dispenser. The reaction interface also preferably exhibits sufficient wicking action so that water applied to it will be evenly distributed across its surface.

In some embodiments, this interface may contain multiple components. For example, the interface may contain a first layer of a porous material, such as screening or plastic or wire mesh or foam, and a second layer of a porous wicking agent. In other embodiments, these elements may be combined (for example, a suitable wicking agent may be deposited on the surfaces of a wire or plastic mesh or foam, or the mesh itself may have wicking characteristics). Specific, non-limiting examples of foams that may be used in the reaction interface include aluminum, nickel, copper, titanium, silver, stainless steel, and carbon foams. The surface of the foam may be treated to increase a hydrophilic nature of the surface. Cellular concrete may also be used in the reaction interface.

The temperature of the reaction interface is an important consideration in many of the embodiments of the devices and methodologies disclosed herein, and hence, various heating elements and temperature monitoring or temperature control devices may be utilized to maintain the reaction interface at a desired temperature. For example, when sodium borohydride is utilized as the hydrogen-containing material, the sodium borate reaction byproduct can exist in various hydration states, and the population of each of these states is a function of temperature. Thus, at 40° C., the tetrahydrate species is the principal reaction product, while at 60° C., the dihydrate species is the principal reaction product, and at 100° C., the monohydrate species is the principal reaction product. From a weight penalty standpoint, it is preferable that the reaction interface be maintained at a temperature that will favor the formation of anhydrous or lower hydrate species, since this will require less water to evolve a given volume of hydrogen gas. Moreover, the resulting system will, in many cases, be less prone to the condensation issues described herein, even if no desiccant is employed in the hydrogen gas stream.

The use of chelating agents for the reaction byproducts may also be useful in the devices and methodologies described herein. For example, when sodium borohydride is used as the hydrogen-containing material, a chelating agent may be added to the sodium borohydride, or to the water or other liquid it is reacted with. Such a material binds the sodium borate reaction byproduct and, by occupying ligand sites, prevents or minimizes the formation of hydrates, especially higher order hydrates. Hence, chelating agents may be advantageously used in some instances to reduce the weight penalty associated with the system. Chelating agents, surfactants and other such materials may also be used in the devices and methodologies described herein as solubility enhancing agents.

F. Control Devices

As previously noted, the hydrogen generators described herein include an inlet into the reaction chamber for the introduction of fluid therein, and an outlet from the reaction chamber for the evolved hydrogen and reaction byproducts to exit the generator. Both the inlet and the outlet of the reaction chamber may comprise various fluid control devices such as, for example, check valves, ball valves, gate valves, globe valves, needle valves, pumps, or combinations thereof. These control devices may further comprise one or more pneumatic or electric actuators and the hydrogen generator may further include a controller in electric or pneumatic communication with one or more of these actuators for controlling the open or closed position of the fluid control devices. Suitable circuitry, chips, and/or displays may also be provided for control purposes.

It will further be appreciated that various types of thermistors and piezoelectric devices may be utilized in the hydrogen generators described herein, both to control the manner and conditions under which reactants are exposed to catalyst, and to control the overall flow of fluids and gases through the hydrogen generator. In some embodiments, these elements and/or the hydrogen generator as a whole may be fabricated as MEMS devices using fabrication techniques that are well known to the semiconductor arts.

G. Antifoaming Agents

In some embodiments of the devices and methodologies disclosed herein, an antifoaming agent is added to the water that is introduced into the reaction chamber. The use of an antifoaming agent may be advantageous in some applications or embodiments, since the generation of hydrogen during the hydration reaction frequently causes foaming. Hence, by adding an antifoaming agent to the reactant water, the size and weight of the hydrogen generator can be minimized, since less volume is required for disengagement of the gas from the liquid/solids. Polyglycol anti-foaming agents offer efficient distribution in aqueous systems and are tolerant of the alkaline pH conditions found in hydrolyzing borohydride solutions. Other antifoam agents may include surfactants, glycols, polyols and other agents known to those having ordinary skill in the art.

H. pH Adjusting Agents

Various pH adjusting agents may be used in the devices and methodologies disclosed herein. The use of these agents is advantageous in that the hydration reaction typically proceeds at a faster rate at lower pHs. Hence, the addition of a suitable acid to the fluid mix entering the reaction chamber, as by premixing the acid into the reactant water, may accelerate the evolution of hydrogen gas. Indeed, in some cases, the use of a suitable acid eliminates the need for a catalyst.

Some non-limiting examples of acids that may be suitable for this purpose include, for example, boric acid, mineral acids, carboxylic acids, sulfonic acids and phosphoric acids. The use of boric acid is particularly desirable in some applications, since it aids recycling by avoiding the addition to the reaction byproduct mixture of additional heteroatoms, as would be the case, for example, with sulfuric acid or phosphoric acid. Moreover, boric acid is a solid and can be readily mixed with the hydrogen-containing material if desired; by contrast, other pH adjusting agents must be added to the aqueous solution or other material being reacted with the hydrogen-containing material.

In some embodiments, cation exchange resin materials may also be used as pH adjusting agents. These materials may be added to the hydrogen containing material in acid form and as high surface area powders.

In other embodiments, carboxylic acids and the like may be used as the pH adjusting agent. These materials may be advantageous in certain applications because they frequently exist in various hydration states, and hence provide additional water to the system. Moreover, some carboxylic acids are capable of undergoing condensation reactions, with the addition of heat, to evolve water. Hence, these materials can aid both with thermal control and by contributing water to the system.

While it may be desirable in some applications of the systems and methodologies disclosed herein to utilize a pH adjusting agent to lower the pH of a hydrogen-generating composition or of a liquid medium that is to be reacted with it, in other applications, the use of a pH adjusting agent may be utilized to increase the pH of the hydrogen-generating composition or the liquid medium with which it reacts. For example, while many hydrogen-generating compositions achieve a higher rate of hydrogen evolution at lower pHs, and while this is desirable in some situations, in other situations, as when it is necessary to transport the hydrogen-generating composition, a high rate of hydrogen evolution may be disadvantageous. In these situations, a pH adjusting agent may be utilized to render the composition more alkaline upon exposure of the material to water or moisture, hence making the composition less reactive and safer to handle.

Some non-limiting examples of alkaline pH adjusting agents include, without limitation, various metal hydroxides, including lithium hydroxide, sodium hydroxide, potassium hydroxide, RbOH, CsOH, ammonium hydroxide, $N(CH_3)_4OH$, $NR_4OH$, $NR^a_xR^b_{(4-x)}OH$, and $NR^aR^bR^cR^dOH$ compounds, wherein $R^a$, $R^b$, $R^c$ and $R^d$ can each independently be hydrogen, alkyl, or aryl groups; various metal oxides, such as $Li_2O$, $Na_2O$, $K_2O$, $Rb_2O$, $Cs_2O$; various organic and metal amines; and the like.

I. Delayed Release Compositions

Various delayed-release compositions may be utilized in the hydrogen-generating materials described herein. Such materials, which may be utilized, for example, to control the reactivity of the hydrogen-generating materials, include, without limitation, slow-release coatings, micro-encapsulations, and/or slowly-dissolving polymer carriers. For example, in some applications, it may be desirable to render the hydrogen-generating composition initially unreactive to water or moisture so that the composition will be safer for handling and transportation. In one particular type of embodiment, this may be accomplished by providing the composition in the form of pellets, granules, or other discrete units whose surfaces are coated with one or more layers of a material or materials that prevent, delay or control the reaction of the composition with moisture, water, or one or more liquid reactants.

One particular example of a delayed release composition that may be used with the hydrogen generating compositions described herein is ethyl cellulose. This material is an excellent film-forming material with strong adhesion that is insoluble in water and that can be used to create a moisture-impermeable barrier over the surfaces of a hydrogen-generating material. It may be used in conjunction with plasticizers such as phthalates, phosphates, glycerides, and esters of higher fatty acids and amides to create films of sufficient flexibility. Ethyl cellulose may be used alone or in combination with water soluble materials such as methyl cellulose as a barrier to delay the reaction of hydrogen-generating materials with water or with other liquid reactions or solutions. Ethyl cellulose coatings may be applied by spray coating or from solutions of appropriate solvents such as cyclohexane.

In some embodiments, ethyl cellulose based films or other suitable materials may be used to form a protective film over hydrogen-generating materials that render these materials safer for shipping and handling. At the point of use, the coated hydrogen-generating material may then be reacted with water or with other liquid reactants or solutions in a controlled or time delayed manner.

In some embodiments, this reaction may be facilitated through the addition of suitable amounts of appropriate solvents and/or surfactants to the liquid reactants or solutions that facilitate the removal of the coating. In the case of ethyl cellulose, for example, if the hydrogen-generating material is being reacted with water or an aqueous solution, suitable amounts of such solvents as ethanol, methanol, acetone, chloroform, ethyl lactate, methyl salicylate, toluene, methylene chloride, or various mixtures of the foregoing may be added to the water or aqueous solution to facilitate the removal of, or the generation of openings in, the coating, thereby allowing the hydrogen-generating material to react. The concentration of these solvents may be manipulated to achieve a desired rate of reaction or to permit the onset of the reaction in a desired time frame.

Alternatively or in combination with the foregoing approach, the coating may be formulated with a sufficient amount of a water soluble material such as methyl cellulose to permit the hydrogen-generating material to react at a desire to rate, or in a desired timeframe, upon exposure to water or to the aqueous solution. It will be appreciated that wide variations of release rates or release patterns can be achieved by varying polymer ratios and coating weights.

In other embodiments, a protective coating or coatings may be applied to pellets, granules, or particles of a hydrogen-generating material to render the material safer for handling and transportation. At the point of use, this coating or coatings may then be stripped with a suitable solvent prior to use of the hydrogen-generating material. Since the total amount of coating applied to the hydrogen-generating material may be quite small, and since the complete removal of this coating from the surfaces of the hydrogen-generating material may not be necessary to render the material suitably reactive to water or to other reagents, in many instances the amount of solvent required to render the material suitably reactive may be quite small.

In still other embodiments, coating removal may be achieved at the point of use through mechanical or physical means. For example, the coated particles of the hydrogen generating material may be subjected to mechanical stress so as to rupture the coating, thereby exposing a portion of the underlying hydrogen-generating material for reaction (in such embodiments, the coating may be made sufficiently brittle so that it is frangible). This can be achieved, for example, by grinding or abrading the particles, subjecting the particles to pressure or sound waves, heating the particles (e.g., so as to induce thermal stress in the coating or to melt or soften the coating), irradiating the particles, or the like.

In some embodiments, the hydrogen-generating composition may be mixed with water-generating materials of the type described herein, and the aforementioned mechanical or physical means may be utilized to induce the evolution of water from the water-generating material. The resulting evolution of hydrogen gas may then rupture or cause perforations or disruptions in the coating, thereby exposing a portion of the hydrogen-generating material for further reaction.

In one specific embodiment, a container of the hydrogen-containing material may be provided which is equipped with a pull tab. When the tab is pulled, the associated mechanical action causes the coating on a portion of the particles to be stripped or ruptured, thereby rendering this portion of the particles available for immediate reaction with water or another suitable liquid medium. The remaining particles can be engineered with a timed release profile that is suitable for the particular application.

In other embodiments, the hydrogen-generating composition may be provided with, or interspersed with, conductive filaments or another suitably conductive medium that can generate localized heating of the particles through ohmic resistance. At the point of use, a suitable electric current can be passed through the conductive medium to melt or rupture a portion of the coating on some of the particles. In such embodiments, the coating may comprise a material such as a hydrocarbon wax that has a suitably low melting or softening temperature.

In further embodiments, multiple coatings schemes or compositions may be utilized to produce a plurality of species of coated hydrogen-generating materials that have different reaction rates, or that react in different timeframes, with respect to a given liquid reagent. For example, in one possible embodiment, a plurality of particles species $M_1, \ldots, M_n$, wherein $n \geq 2$, may be created that have respective coatings $C_1, \ldots, C_n$, wherein, for i=1 to n, coating $C_i$ allows a percentage $p_i$ of the hydrogen generating material in particle species $M_i$ to react with water or another liquid reagent within $t_i$ minutes. The species $M_1, \ldots, M_n$ may then be mixed in various relative proportions, concentrations or weight percentages such that the resulting mixture has a desired hydrogen generation profile as a function of time.

As noted above, in some embodiments, multiple coatings may be utilized that have different chemical or physical properties. For example, in some embodiments, a modified release coating may be used as an external coating, and a stabilizing coating may be used as an interior coating. In such embodiments, the stabilizing coat may act as a physical barrier between the hydrogen-generating material and the modified release coating.

For example, the stabilizing coat may act to slow migration of moisture or solvent between the modified release coating and the hydrogen-generating material. While the stabilizing coat will preferably keep the hydrogen-generating separated from the modified release coating during storage, the stabilizing coating will preferably not interfere significantly with the rate of release or reaction of the hydrogen-generating material, and therefore may be semi-permeable or even soluble in water or in the liquid medium that the hydrogen-generating material is to be reacted with. Hence, the stabilizing coat may be utilized to keep migration of hydrogen-generating materials to a minimum such that their interaction with coating materials is reduced or prevented, while still allowing for release of hydrogen-generating materials in an aqueous environment.

The stabilizing coat may be any suitable material which creates an inert barrier between the hydrogen-generating material and the modified release coating, and may be water soluble, water swellable or water permeable polymeric or monomeric materials. Examples of such materials include, but are not limited to, hydroxypropylmethyl cellulose, hydroxypropyl cellulose, polyvinyl pyrrolidone, polyethylene glycol or methacrylate based polymers. Preferably the stabilizing coat includes a water-soluble polymer that does not interfere with the release of the hydrogen-generating material.

The modified release coating may also be any suitable coating material, or combination of coating materials, that will provide the desired modified release profile. For example, coatings such as enteric coatings, semi-enteric coatings, delayed release coatings or pulsed release coatings may be desired. In particular, coatings may be utilized that provide an appropriate lag in release prior to the rapid release at a rate essentially equivalent to immediate release of the hydrogen-containing material.

In particular, materials such as hydroxypropylmethyl cellulose phthalate of varying grades, methacrylate based polymers and hydroxypropylmethyl cellulose acetate succinate may be utilized in various applications. It is also possible to use a mixture of enteric polymers to produce the modified release coating, or to use a mixture of enteric polymer with a water permeable, water swellable or water-soluble material. Suitable water-soluble or water permeable materials include but are not limited to hydroxypropylmethyl cellulose, hydroxypropyl cellulose, polyvinyl pyrrolidone, polyethylene glycol or mixtures thereof.

Another class of delayed release coatings that may be utilized in some embodiments of the compositions, systems and methodologies described herein are basic materials, such as metal hydroxides or metal or organic amines, including the materials described herein as pH adjusting agents. In the case of hydrogen-generating materials that react with water or aqueous solutions, coatings of these materials on the exterior surfaces of the hydrogen-generating materials can be used to render the hydrogen-generating material essentially unreactive (or reactive at a very slow rate) to moisture or to relatively small amounts of water by rendering the effective pH at the reaction interface (e.g., at the surface of the hydrogen-generating material) sufficiently alkaline. On the other hand, if the amount of coating material is sufficiently small, at the point of use, the amount of water or liquid medium that the hydrogen-generating material is exposed to may be sufficiently large to solvate the alkaline material without significantly affecting the pH of the resulting solution. So long as the coating is selected such that solvation occurs fast enough, the presence of such a coating can be made to have little or no effect on the reactivity of the particles of the hydrogen-generating material at the point of use.

J. Wicking Agents

As previously noted, the hydrolysis reaction of a hydride cannot proceed if water is unable to reach the hydride. When pellets of some hydrides, such as LiH, react with water, a layer of insoluble reaction products is formed that blocks further contact of the water with the hydride. The blockage can slow down or stop the reaction.

The devices and methodologies disclosed herein overcome this problem by providing a means for expelling such insoluble products from the reaction zone. However, in some cases, the addition of a wicking agent within the pellets or granules of the hydride or borohydride improves the water distribution through the pellet or granule and ensures that the hydration reaction quickly proceeds to completion. Both salt-like hydrides and covalent hydrides benefit from an effective dispersion of water throughout the hydride. Useful wicking materials include, for example, cellulose fibers like paper and cotton, modified polyester materials having a surface treatment to enhance water transport along the surface without absorption into the fiber, and polyacrylamide, the active component of disposable diapers. The wicking agents may be added to the hydrogen-containing material in any effective amount, preferably in amounts between about 0.5 wt % and about 15 wt % and most preferably, between about 1 wt % and about 2 wt %. It should be noted, however, that, in some applications, variations in the quantity of wicking material added to the hydrogen-containing material do not seem to be significant; i.e., a small amount of wicking material is essentially as effective as a large amount of wicking material.

In some embodiments, one or more wicking agents may be used to create a conduit in which at least a portion of the excess water which may be present in the hydrogen generation reaction byproducts may be returned to another part of the hydrogen generator so that it may be further utilized in the generation of hydrogen gas. Such wicking agents may be disposed, for example, downstream from the catalytic reactor, and may be in fluidic contact with a water reservoir or with the catalytic reactor itself.

K. Liquid Reactants

While the devices and methodologies described herein have frequently been explained in reference to the use of water as a reactant with the hydride, borohydride, borane, or other hydrogen containing material, it will be appreciated that various other materials may be used in place of, or in addition to, water. For example, various alcohols may be reacted with the hydrogen-containing material. Of these, low molecular weight alcohols, such as methanol, ethanol, normal and iso-propanol, normal, iso- and secondary-butanol, ethylene glycol, propylene glycol, butylene glycol, and mixtures thereof, are especially preferred. The alcohols may be used either alone or as aqueous solutions of varying concentrations. Liquid reactants containing alcohol may be particularly useful in low temperature applications where the liquid reactant may be subjected to freezing. Various liquid reactants containing ammonia or other hydrogen containing materials may also be used.

The above description of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims.

What is claimed is:

1. A hydrogen generator, comprising:
a first chamber containing a fluid;
a second chamber which is in fluidic communication with said first chamber by way of a valve, wherein said second chamber contains a material that reacts with said fluid in the presence of a catalyst to generate hydrogen gas, and wherein said valve is movable between a first valve position in which the flow of fluid from said first chamber to said second chamber is enabled, and a second valve position in which the flow of fluid from said first chamber to said second chamber is disabled; and
a catalytic reactor which is in fluidic communication with said second chamber and which contains said catalyst disposed on a retractable surface, wherein said retractable surface is movable from a first surface position in which said catalyst is in contact with the flow of said fluid in said catalytic reactor, to a second surface position in which said catalyst is not in contact with the flow of said fluid in said catalytic reactor;
wherein said retractable surface moves from said first surface position to said second surface position when the pressure of hydrogen gas within the catalytic reactor exceeds a first predetermined threshold level, and wherein said retractable surface does not extend into said second chamber when said retractable surface is in said second position.

2. The hydrogen generator of claim 1, wherein said fluid flows along a first pathway from said first chamber to said second chamber.

3. The hydrogen generator of claim 2, wherein said fluid flows along a second pathway from said second chamber to said catalytic reactor.

4. The hydrogen generator of claim 1, wherein said first chamber is maintained under positive pressure.

5. The hydrogen generator of claim 1, wherein said first chamber contains at least one flexible wall.

6. The hydrogen generator of claim 1, wherein said first chamber is adapted to shrink as fluid is withdrawn from it.

7. The hydrogen generator of claim 6, wherein said first chamber comprises a stretched elastic membrane.

8. The hydrogen generator of claim 1, wherein said first chamber contains a flexible surface, and wherein a pressure application means is provided to apply pressure to the flexible surface.

9. The hydrogen generator of claim 8, wherein said pressure application means comprises at least one stretched elastic band disposed about said flexible surface.

10. The hydrogen generator of claim 8, wherein said pressure application means is said catalytic reactor.

11. The hydrogen generator of claim 1, wherein said valve is a diaphragm valve.

12. The hydrogen generator of claim 1, wherein said valve comprises a piezoelectric actuator.

13. The hydrogen generator of claim 1, wherein said fluid forms a slurry with said material in said second chamber.

14. The hydrogen generator of claim 13, wherein said slurry flows into said catalytic reactor.

15. The hydrogen generator of claim 1, wherein said catalyst is disposed upon said retractable surface.

16. The hydrogen generator of claim 15, wherein said retractable surface is movable from said first surface position in which said catalyst is in contact with a fluid in said catalytic reactor, to said second surface position in which said catalyst is not in contact with said fluid in said catalytic reactor.

17. The hydrogen generator of claim 16, wherein said retractable surface is movable from said first surface position to said second surface position by way of a spring.

18. The hydrogen generator of claim 1, further comprising a third chamber disposed downstream of said catalytic reactor for the storage of reaction byproducts.

19. The hydrogen generator of claim 18, further comprising a separation chamber disposed between said catalytic reactor and said third chambers, said separation chamber being adapted to separate hydrogen gas from reaction byproducts.

20. The hydrogen generator of claim 18, wherein said first and third chambers share a common surface.

21. The hydrogen generator of claim 20, wherein said common surface is flexible.

22. The hydrogen generator of claim 1, wherein said second chamber is maintained under a positive pressure.

23. The hydrogen generator of claim 1, wherein said second chamber contains an inlet, an outlet, and a porous element in fluidic communication with said inlet and said outlet.

24. The hydrogen generator of claim 23, wherein said second chamber is configured to press said material against said porous element.

25. The hydrogen generator of claim 24, wherein said second chamber is equipped with a spring which presses said material against said porous element.

26. The hydrogen generator of claim 1, wherein said valve moves from said first valve position to said second valve position when the pressure of hydrogen gas within the catalytic reactor exceeds a second predetermined threshold level.

27. The hydrogen generator of claim 1, wherein said valve moves from said first valve position to said second valve position when said retractable surface is in said second surface position.

28. The hydrogen generator of claim 1, wherein said retractable surface is disposed on a spring-activated piston.

29. The hydrogen generator of claim 1, wherein said valve moves from said first valve position to said second valve position in response to an increase in pressure in said second chamber.

30. The hydrogen generator of claim 1, wherein said second chamber does not contain said catalyst.

31. The hydrogen generator of claim 1, wherein said retractable surface does not extend into said second chamber when said retractable surface is in said first position.

32. The hydrogen generator of claim 1, wherein said catalytic reactor has an inlet which is in fluidic communication with said second chamber and an outlet which is in fluidic communication with said inlet, and wherein said retractable surface is disposed between said inlet and said outlet.

33. The hydrogen generator of claim 32, wherein said inlet is disposed in a wall of said third chamber.

34. The hydrogen generator of claim 33, wherein said inlet is spaced apart from said outlet, and wherein said inlet is spaced apart from said retractable surface.

35. The hydrogen generator of claim 2, wherein said retractable surface moves from said first position when the pressure of hydrogen gas within the catalytic reactor is $P_1$, to the second condition when the pressure of hydrogen gas within the catalytic reactor is $P_2$, and wherein $P_2 > P_1$.

36. The hydrogen generator of claim 35, wherein $P_1$ is within the range of about 2 to about 10 torr.

37. The hydrogen generator of claim 36, wherein $P_2$ is greater than about 10 torr.

* * * * *